US007024005B2

(12) United States Patent
Dance et al.

(10) Patent No.: US 7,024,005 B2
(45) Date of Patent: *Apr. 4, 2006

(54) METHOD AND APPARATUS FOR REDUCING IMPULSE NOISE IN A SIGNAL PROCESSING SYSTEM

(75) Inventors: Christopher R. Dance, Cambridge (GB); Ercan E. Kuruoglu, Cambridge (GB)

(73) Assignee: Xerox Corporation, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 10/951,797

(22) Filed: Sep. 29, 2004

(65) Prior Publication Data

US 2005/0058302 A1    Mar. 17, 2005

Related U.S. Application Data

(63) Continuation of application No. 09/267,968, filed on Mar. 12, 1999.

(30) Foreign Application Priority Data

Dec. 24, 1998    (GB)    .................................... 9828441

(51) Int. Cl.
H04B 15/00    (2006.01)

(52) U.S. Cl. .................................... 381/94.7

(58) Field of Classification Search ................ 381/94.7
See application file for complete search history.

(56) References Cited

U.S. PATENT DOCUMENTS 5,960,036 A    9/1999    Johnson et al. ............. 375/219

6,072,782 A    6/2000    Wu ............................. 370/286

OTHER PUBLICATIONS

Claims 4,5 and 49 of U.S. Appl. No. 09/267,968 to Christopher R. Dance et al. filed Mar. 12, 1999.*
Barton, Melbourne, "Impulse Noise Performance of an Asymmetric Digital Subscriber Lines Passband Transmission System," IEEE Transactions on Communications, vol. 43, No. 2/3/4, Feb./Mar./Apr. 1995, pp. 1337-1340.
European Search Report for EP counterpart Application No. 99310165 with search date of Apr. 16, 2003.
Henkel, Werner et al., "Coded 64-CAP ADSL in an Impulse-Noise Environment—Modeling of Impulse Noise and First Simulation Results," IEEE Journal on Selected Areas in Communications, vol. 13, No. 9, Dec. 1995, pp. 1611-1621.

(Continued)

*Primary Examiner*—Vivian Chin
*Assistant Examiner*—Devona E Faulk

(57)    ABSTRACT

An observed signal that is corrupted with impulse noise is recorded in a signal processing system of an image processing system or a digital subscriber line (xDSL). The observed signal that is recorded by the signal processing system includes a noise component and data component. The signal processing system estimates the parameters of an alpha-stable distribution using a modified iteratively reweighted least squares (IRLS) technique. The estimated parameters define a probability density function that is used to model the noise component of the observed signal. Once the parameters of the alpha-stable distribution are estimated, the signal processing system uses them to estimate model coefficients of a non-linear prediction filter such as a Volterra filter. Using the model coefficients, the non-linear prediction filter estimates the data component of the observed signal.

20 Claims, 12 Drawing Sheets

OTHER PUBLICATIONS

Ilow, Jacek et al. "Detection in Alpha-Stable Noise Environments Based on Prediction," International Journal of Adaptive Control and Signal Processing, vol. 11, No. 7, Nov. 1997, pp. 555-568.

Kerpez, Kenneth J. et al., "The Error Performance of Digital Subscriber Lines in the Presence of Impulse Noise," IEEE Transactions on Communications, vol. 43, No. 5, May 1995, pp. 1902-1905.

Kim, Hyun Mun et al. "Fuzzy Prediction and Filtering in Impulsive Noise," Fuzzy Sets & Systems, vol. 77, No. 1, Jan. 1996, pp. 15-33.

Kogon, Stephen M. et al., "On the Characterization of Impulsive Noise with $\alpha$-Stable Distributions Using Fourier Techniques," IEEE Proceedings of ASILOMAR-29, 1996, pp. 787-791.

Kuruoglu, Ercan E. et al., "Impulsive Noise Elimination Using Polynomial Iteratively Reweighted Least Squares," Proceedings 1996 IEEE Digital Signal Processing Workshop Proceedings, Sep. 1-4, 1996, Loen, Norway, pp. 347-350.

Kuruoglu, Ercan E. et al., "Least $\angle_p$-Norm Estimation of Autoregressive Model Coefficients of Symmetric $\alpha$-Stable Processes," IEEE Signal Processing Letters, vol. 4, No. 7, Jul. 1997, pp. 201-203.

Kuruoglu, Ercan E. et al., "Least $\angle_p$-Norm Impulsive Noise Cancellation with Polynomial Filters," Signal Processing, vol. 69, No. 1, Aug. 1998, pp. 1-14.

Kuruoglu, Ercan E. et al., "Near Optimal Detection Of Signals In Impulsive Noise Modeled With A Symmetric Alpha-Stable Distribution", published in IEEE Communications Letters, vol. 2, No. 10, pp. 282-284, Oct. 1998.

Kuruoglu, Ercan E. et al., "A Near Optimal Receiver for Detection in $\alpha$- Stable Distributed Noise," Proceedings of 1998 IEEE Statistical Signal and Array Processing Workshop, Portland, Oregon, USA, Sep. 14-16, 1998 (also published in IEEE Communications Letters, vol. 2, No. 10, pp. 282-284, Oct. 1998).

Ma, Xinyu et al., "Parameter Estimation and Blind Channel Identification in Impulsive Signal Environments," IEEE Transactions on Signal Processing, vol. 43, No. 12, Dec. 1995, pp. 2884-2897.

McCulloch, J. Huston, "Simple Consistent Estimators of Stable Distribution Parameters," Communications in Statistics-Simulation and Computation, vol. 75, 1986, pp. 1109-1136.

Nolan, John P., "Maximum Likelihood Estimation and Diagnostics for Stable Distributions," available from http://www.cas.american.edu/~jpnolan/stable.html, 1998.

Tsihrintzis, George A. et al, "Fast Estimation of the Parameters of Alpha-Stable Impulsive Interference," IEEE Transactions on Signal Processing, vol. 44, No. 6, Jun. 1996, pp. 1492-1503.

Zolotarev, V. M., "Mellin-Stieltjes Transforms in Probability Theory," Theory of Probability and its Applications, vol. 2, No. 4, 1957, pp. 433-459.

Barton, Melbourne, "Impulse Noise Performance of an Asymmetric Digital Subscriber Lines Passband Transmission System," IEEE Transactions on Communications, vol. 43, No. 2/3/4, Feb./Mar./Apr. 1995, pp. 1337-1340, no day.

European Search Report for EP counterpart Application No. 99310165 with search date of Apr. 16, 2003.

Henkel, Werner et al., "Coded 64-CAP ADSL in an Impulse-Noise Environment—Modeling of Impulse Noise and First Simulation Results," IEEE Journal on Selected Areas in Communications, vol. 13, No. 9, Dec. 1995, pp. 1611-1621, no day.

Ilow, Jacek et al. "Detection in Alpha-Stable Noise Environments Based on Predictin," International Journal of Adaptive Control and Signal Processing, vol. 11, No. 7, Nov. 1997, pp. 555-568, no day.

Kerpez, Kenneth J. et al., "The Error Performance of Digital Subscriber Lines in the Presence of Impulse Noise," IEEE Transactions on Communications, vol. 43, No. 5, May 1995. pp. 1902-1905, no day.

Kim, Hyun Mun et al. "Fuzzy Prediction and Filtering in Impulsive Noise," Fuzzy Sets & Systems, vol. 77, No. 1, Jan. 1996, pp. 15-33.

Kogon, Stephen M. et al, "On the Characterization of Impulsive Noise with $\beta$-Stable Distributions Using Fourier Techniques," IEEE Proceedings of ASILOMER-29, 1996, pp. 787-791.

Kuruoglu, Ercan E. et al., "Impulsive Noise Elimination Using Polynomial Iteratively Reweighted Least Squares, "Proceedings 1996 IEEE Digital Signal Processing Workshop Proceedings, Sep. 1-4, 1996, Loen, Norway, p. 347-350.

Kuruoglu, Ercan E. et al., "Least $L_p$-Norm Estimation of Autoregressive Model Coefficients of Symmetric $\beta$-Stable Processes," IEEE Signal Processing Letters, vol. 4, No. 7, Jul. 1997, pp. 201-203.

Kuruoglu, Ercan E. et al., "Least $L_p$-Norm Impulsive Noise Cancellation with Polynomial Filters," Signal Processing, vol. 69, No. 1, Aug. 1998, pp. 1-14.

Kuruoglu, Ercan E. et al, "Near Optical Detection Of Signals In Impulsive Noise Modeled with A Symmetric Alpha-Stable Distribution", published in IEEE Communications Letters, vol. 2, No. 10, pp. 282-284, Oct. 1998.

Kuruoglu, Ercan E. et al., "A Near Optimal Receiver for Detecton In $\beta$-Stable Distributed Noise," Proceedings of 1998 IEEE Statistical Signal and Array Processing Workshop, Portland, Oregon, USA, Sep. 14-16, 1998 (also published in IEEE Communications Letters, vol. 2, No. 10, pp. 282-284, Oct. 1998).

Ma, Xinyu et al., "Parameter Estimation and Blind Channel Indentification in Impulsive Signal Environments," IEEE Transactions on Signal Processing, vol. 43, No. 12, Dec. 1995, pp. 2884-2897.

McCullough, J. Huston, "Simple Consistent Estimators of Stable Distribution Parameters," Communications in Statistics-Simulation and Computation, vol. 75, 1996, pp. 1109-1136.

Nolan, John P., "Maximum Likelihood Estimation and Diagnostics for Stable Distributions," availbale from http://www.cas.american.edu/~jpnolan/stable.html, 1998.

Tsihrintzis, George A. et al., "Fast Estimation of the Parameters of Alpha-Stable Impulsive Interference," IEEE Transactions on Signal Processing, vol. 44, No. 6, Jun. 1996, pp. 1492-1503.

Zolotarev, V.M., "Mellin-Stieltjes Transforms in Probability Theory," Theory of Probability and Its Applications, vol. 2, No. 4, 1957, pp. 433-459.

* cited by examiner

FIG. 9C (A) → REPEAT STEP 954 AND LET THE ESTIMATES OF $\alpha, \gamma$ EQUAL THE SOLUTION TO THE MATRIX EQUATION — 956

COMPUTE $\omega_k = -Imlog(\hat{\varphi}(t_k))/t_k$ FOR SEQUENCE X FOR $k = 1, \ldots, m$. — 957

LET W BE THE $m \times m$ IDENTITY MATRIX — 958

LET $C = W^{-1}$ BE IN THE INVERSE OF MATRIX W. COMPUTE $\beta$ AND $\delta$ BY SOLVING THE FOLLOWING MATRIX EQUATION: — 959

$$\begin{bmatrix} \kappa^2 \sum_{\substack{j=1,k=1}}^{j=m,k=m} (t_j t_k)^{\alpha-1} C_{jk} & \kappa \sum_{\substack{j=1,k=1}}^{j=m,k=m} t_k^{\alpha-1} \omega_j C_{jk} \\ \kappa \sum_{\substack{j=1,k=1}}^{j=m,k=m} t_k^{\alpha-1} C_{jk} & \sum_{\substack{j=1,k=1}}^{j=m,k=m} C_{jk} \end{bmatrix} \begin{bmatrix} \beta \\ \delta \end{bmatrix} = \begin{bmatrix} \sum_{\substack{j=1,k=1}}^{j=m,k=m} t_k^{\alpha-1} \omega_j C_{jk} \\ \sum_{\substack{j=1,k=1}}^{j=m,k=m} \omega_j C_{jk} \end{bmatrix}$$

WHERE $\kappa = \gamma \tan\left(\dfrac{\alpha\pi}{2}\right)$

USING THE COMPUTED VALUES FOR $\beta$ AND $\delta$, SET THE ELEMENTS OF MATRIX W TO: — 960

$$W_{sr} = \dfrac{1}{2(R_s^2 + I_s^2)(R_r^2 + I_r^2) t_s t_r} \{R_{s+r}(I_s I_r - R_s R_r) + R_{s-r}(I_s I_r + R_s R_r) + I_{s+r}(I_s R_r + R_s I_r) + I_{s-r}(I_s R_r - R_s I_r) - 4R_s I_s R_r I_r\}$$

WHERE $R_s = Re(\varphi(t_s)), I_s = Im(\varphi(t_s)), R_{s+r} = Re(\varphi(t_s+t_r)), etc.$ $\varphi(t) = exp\left\{-\gamma|t|^\alpha\left(1 + j\beta \tan\dfrac{\alpha\pi}{2}\right) + j t \delta\right\}$ REPEAT STEP 960 AND LET THE ESTIMATES OF $\beta, \delta$ EQUAL THE SOLUTION TO THE MATRIX EQUATION — 961

METHOD AND APPARATUS FOR REDUCING IMPULSE NOISE IN A SIGNAL PROCESSING SYSTEM

CROSS-REFERENCE TO RELATED APPLICATIONS

This application is a continuation application of U.S. application Ser. No. 09/267,968 filed Mar. 12, 1999, claims priority therefrom and incorporates its disclosure herein by reference.

BACKGROUND OF THE INVENTION

1. Field of the Invention

The present invention relates generally to signal processing, and more particularly, to a method and apparatus for reducing impulse noise in signals transmitted using communication services or recorded using imaging devices.

2. Description of Related Art

Currently, there is a significant desire to exploit the unused available bandwidth of the twisted pair lines of the existing plain old telephone system (POTS) for providing various digital services. Although it is believed that the future media for networked data transmission will be fiber optic based and although the main backbone of the network that interconnects the switching centers is now mainly optical fiber, the 'last mile' which is the access portion of the network that connects switches to customers is still dominated by twisted copper wires. For example, there exits over 560 million 'last mile' twisted copper pair connections globally. The estimated cost of replacing these connections with fiber optics is prohibitive and therefore the existing unused bandwidth of the POTS provides an important alternative.

Advanced digital transmission techniques such as digital subscriber line services utilize the existing unused bandwidth of the POTS for providing increased data transmission rates for available digital data transmission services. By convention, "digital subscriber line" services are referred to as "DSL" services. The term "DSL" refers a connection created by a modem pair enabling high-speed digital communications. More generally, DSL is referred to as xDSL, where the 'x' indicates a number of different variants of the service (e.g., H (High), S (Single-Line), and A (Asymmetric)).

One factor that impairs the performance of xDSL services or other similar services that operate at high frequencies, such as integrated digital services network (ISDN), is "impulse noise." Impulse noise is noise that occurs with high amplitudes on telephone lines or other transmission mediums. That is, samples of impulse noise have very large amplitudes that occur much more frequently than they would with Gaussian noise. Some known causes of impulse noise include electrical equipment operating near the telephone line or relay re-openings and the ringing of a telephone on the line.

In operation, xDSL services rely on modems to carry digital signals over the pass-band channels of the POTS. The modems translate digital data to analog signals at the sender end of the telephone line and translate the analog signals to digital data at the receiver end of the telephone line. The analog signal output at the receiver end of a telephone line is a corrupted version of the analog signal input at the sender end of the telephone line.

More specifically, the analog signal output from a telephone line is generally referred to as an "observed" signal. The observed signal includes a noise component and data component. An observed signal without the noise component is defined herein as a clean signal. In order to recover the data component from the observed signal, impulse noise introduced during the transmission of the data component must be identified.

One technique for recovering the data component is to estimate (i.e., predict) what the clean signal is without the noise component. Data components of output signals that are estimated are referred to herein as "cleaned" signals. One such estimation technique isolates the noise component from the data component in an observed signal by modeling the noise component using a probability density function (i.e., pdf) that describes the observed statistical properties of the noise component.

Once the noise component is accurately modeled using a pdf, the pdf can be used to define an error criterion (also referred to herein as a cost function). The error criterion is minimized to solve for model parameters, which are used to estimate the data component of a sampled signal.

A common pdf used to model noise is a Gaussian (or normal) distribution. One factor for using a Gaussian distribution to estimate noise is that the Gaussian assumption leads to simple estimation techniques. The reason the Gaussian distribution does not accurately estimate impulse noise is because impulse noise exhibits large amplitudes known as outliers that occur too frequently to fit to a Gaussian model. This characteristic suggests that the underlying probability distribution that models the noise has heavier tails as compared to a Gaussian distribution.

It has been suggested that an alpha-stable distribution is one alternative to a Gaussian distribution for modeling impulse noise. Because there exists no compact form to express its probability distribution function, an alpha-stable distribution is typically defined by its characteristic function $\Phi(z)$, which is the Fourier transform of its probability density function.

$$\Phi(z)=\exp\{j\delta z-\gamma|z|^{\alpha}[1+j\beta sign(z)w(z,\alpha)]\} \quad (1)$$

where, $\alpha$ is the characteristic exponent such that $0<\alpha\leq 2$,
$\beta$ is the symmetry parameter such that $-1\leq\beta\leq 1$,
$\gamma$ the dispersion such that $\gamma>0$,
$\delta$ is the location parameter such that $-\infty<\delta<\infty$, and $$w(z,\alpha)=\begin{cases}\tan\frac{\alpha\pi}{2}, & \text{if } \alpha\neq 1 \\ \frac{2}{\pi}\log|z|, & \text{if } \alpha=1\end{cases}.$$

More specifically, the parameters control the properties of the pdf of an alpha-stable distribution as follows. The characteristic exponent $\alpha$ is a measure of the thickness of the tails of the alpha-stable distribution. The special case of $\alpha=2$ corresponds to the Gaussian distribution, and the special case of $\alpha=1$ with $\beta=0$ corresponds to the Cauchy distribution. The symmetry parameter $\beta$ sets the skewness of the alpha-stable distribution. When $\beta=0$ the distribution is symmetric around the location parameter $\delta$, in which case the alpha-stable distribution is called a symmetric alpha-stable (i.e., S$\alpha$S) distribution. The location parameter $\delta$ determines the shift of the alpha-stable distribution from the origin, and is the mean (if $1<\alpha\leq 2$) or median (if $\beta=0$) of the alpha-stable distribution. Finally, the dispersion $\gamma$ measures the deviation around the mean in a manner similar to the variance of a Gaussian distribution.

Alpha-stable distributions have been used to design systems for detecting signals in the presence of impulse noise. (See for example, E. E. Kuruoglu, W. J. Fitzgerald and P. J. W. Rayner, "Near Optimal Detection of Signals in Impulsive Noise Modeled with a Symmetric alpha-Stable Distribution", *IEEE Communications Letters*, Vol. 2, No. 10, pp. 282–284, October 1998.) However, most of these systems that use alpha-stable distributions in their statistical models, assume a priori knowledge of the parameters of the alpha-stable distribution. Systems that assume a priori knowledge of the parameters of an alpha-stable distribution pre-assign values for the parameters. Having the ability to estimate, and not pre-assign, the value of parameters of the alpha-stable distribution is vital since most existing systems are sensitive to the parameters of the alpha-stable distribution that models the impulse noise.

Existing methods for estimating parameters of an alpha-stable distribution generally provide limited solutions for the special case of a symmetric alpha-stable distribution (S$\alpha$S) (i.e., where the parameter $\beta$=0). Assuming that an alpha-stable distribution is symmetric, however, may yield a poor model of impulse noise because impulse noise tends to be more accurately modeled by skewed rather than symmetric distributions. Existing methods for estimating the parameters of an alpha-stable distribution, which provide general solutions that are not limited to the special case of a symmetric distribution, tend to be computationally expensive or provide estimates with high variances.

It would be advantageous therefore to provide an improved system for modeling additive impulse noise corrupting data streams. Furthermore, it would be advantageous if such a system were able to model impulse noise using an alpha-stable distribution. Also, it would be advantageous if the improved system were able to adaptively estimate, and not pre-assign, the parameters of an alpha-stable distribution.

SUMMARY OF THE INVENTION

In accordance with the invention, there is provided a signal processing system for reducing impulse noise corrupting sampled signals. A memory of the signal processing system accumulates sampled signals from a transmission medium. The sampled signals have a noise component and a data component. In one embodiment of the invention, signals are sampled after being transmitted over a transmission medium such as a digital subscriber line (DSL) service. In another embodiment of the invention, signals are sampled from a transmission medium such as a sensor array in an imaging system such as a scanner.

In accordance with one aspect of the invention, a parameter estimation module estimates the parameters of an alpha-stable distribution. The alpha-stable distribution is used to model impulse noise corrupting data signals input into the transmission medium of the signal processing system. A coefficient optimization module uses a modified iteratively reweighted least squares (IRLS) technique to optimize the model coefficients of a prediction filter, such as a Volterra filter. Using the model coefficients, the prediction filter computes an estimate of the data component of the signals sampled from the transmission medium without the noise component.

In accordance with another aspect of the invention, the parameters of an alpha-stable distribution are estimated using a sampled signal having only a noise component. In the embodiment in which the signal processing systems operates a DSL service, a clean signal is transmitted over an analog data channel. To sample a signal without a data component, the analog data channel is sampled when no data signals are transmitted over the data channel. In contrast, in the embodiment in which the signal processing system operates in an imaging system, a sampled signal containing only a noise component is generated by applying centro-symmetrizing and centralizing transformations to corresponding pixels from multiple recorded images of the same scene.

In accordance with yet another aspect of the invention, the characteristic exponent of an alpha-stable distribution is used to define the order of the moment in the cost function that optimizes estimation of cleaned signals by the prediction filter. In effect, the cost function is defined to be the $p^{th}$-power error criterion, and the modified IRLS technique is applied to optimize the model coefficients of the prediction filter.

Advantageously, the present invention provides a method and apparatus therefor, for modeling impulse noise in xDSL services using an alpha-stable distribution. In addition, a number of different methods for computing parameters of the alpha-stable distribution are disclosed. Generally, these different methods for estimating parameters of an alpha-stable distribution include the steps of performing transformations and computing moments.

BRIEF DESCRIPTION OF THE DRAWINGS

These and other aspects of the invention will become apparent from the following description read in conjunction with the accompanying drawings wherein the same reference numerals have been applied to like parts and in which:

FIGS. 9A, 9B, and 9C are flow diagrams which set forth two different combinations of steps for estimating the parameters $\alpha$, $\beta$, $\gamma$, and $\delta$ of an alpha-stable distribution;

DETAILED DESCRIPTION

A. Operating Environment

Figure 1:
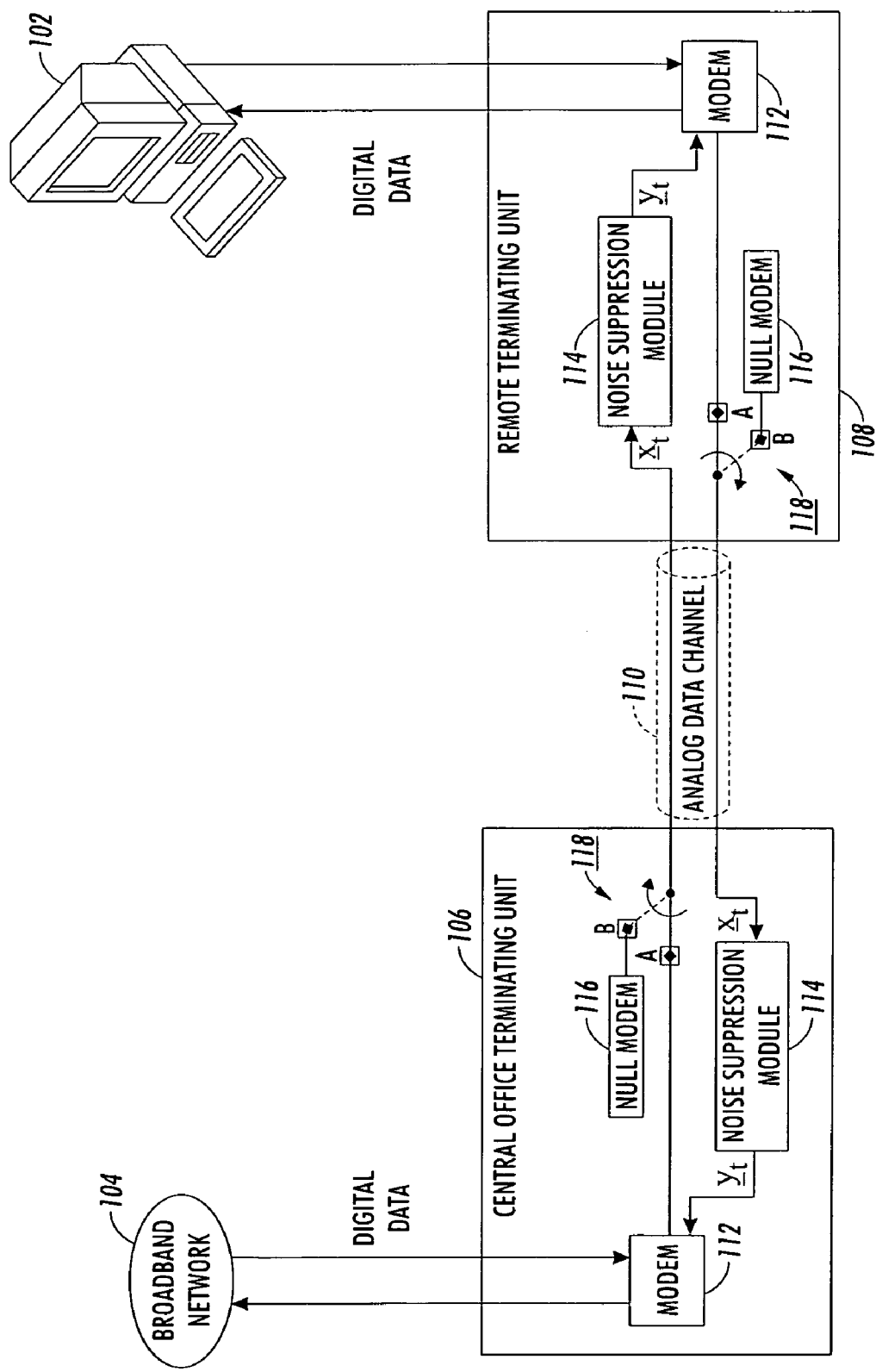
FIG. 1 illustrates an operating environment of a signal transmission system for performing the present invention.

FIG. 1 illustrates an operating environment of a signal transmission system (i.e., signal processing system) for performing the present invention. The operating environment of the signal transmission system includes a multi-functional device 102 that communicates with other devices over a broadband network 104. The multi-functional device 102 receives and transmits digital data over the broadband network through a central office terminating unit 106 and a remote terminating unit 108. The terminating units 106 and 108 form a modem pair that operate together to transmit digital data over an analog data channel (or pass-band channel) 110. In one embodiment, the analog data channel 110 is a twisted pair line of the plain old telephone system (POTS).

The terminating units 106 and 108 have switches 118. Each of the switches 118 have two operating positions A and B. In the operating position A, the terminating units are in normal operating mode, during which digital data is transmitted between the multi-functional device 102 and the broadband network 104 over the analog data channel 110. In the operating position B, the terminating units couple the input to the analog data channel with a null modem 116. The purpose of the null modem 116 is to sample the analog data channel 110 when it is absent of data signals. As discussed in more detail below, the null modems 116 provide the noise suppression modules 114 with a sampled signal consisting of a noise component and no data component.

In accordance with one aspect of the invention, the central office terminating unit 106 and the remote terminating unit 108 operate together to provide a digital subscriber line (xDSL) service. Each of the terminating units 106 and 108 includes a modem 112 for transmitting digital signals over the analog data channel 110. The modems 112 receive signals filtered by a noise suppression module 114. The noise suppression module reduces impulse noise corrupting signals transmitted over the analog data channel 110. To transmit and receive digital data, the modems 112 in the terminating units 106 and 108 typically include a modulator unit and a demodulator unit. To transmit digital data, the modulator unit of a modem receives digital data and encodes the digital data into one or more symbols having a plurality of bits. Each encoded symbol is then input to a transmit filter which is used to produce a continuous time signal. The continuous time signal is transmitted over the analog data channel 110.

The signal sampled at the output of either end of the analog data channel 110 is defined herein as the observed signal $\underline{x}_t$. In accordance with another aspect of the invention, the observed signal $\underline{x}_t$ is processed by the noise suppression module 114 before being demodulated by a demodulator unit and decoded by a decoder unit in the modem 112. The demodulator unit of the modem receives a cleaned signal $\underline{y}_t$, which is the output of the noise suppression module 114. The symbols output by the demodulator unit of the modem are then input to the decoder unit of the modem to produce digital data. When the modem 112 forms part of the remote terminating unit 108, the multi-functional device 102 receives the digital data output by the decoder unit of the modem. Alternatively, when the modem 112 forms part of the central office terminating unit 106, the digital data is output to the broadband network 104.

B. Overview of the Noise Suppression Module

Figure 2:
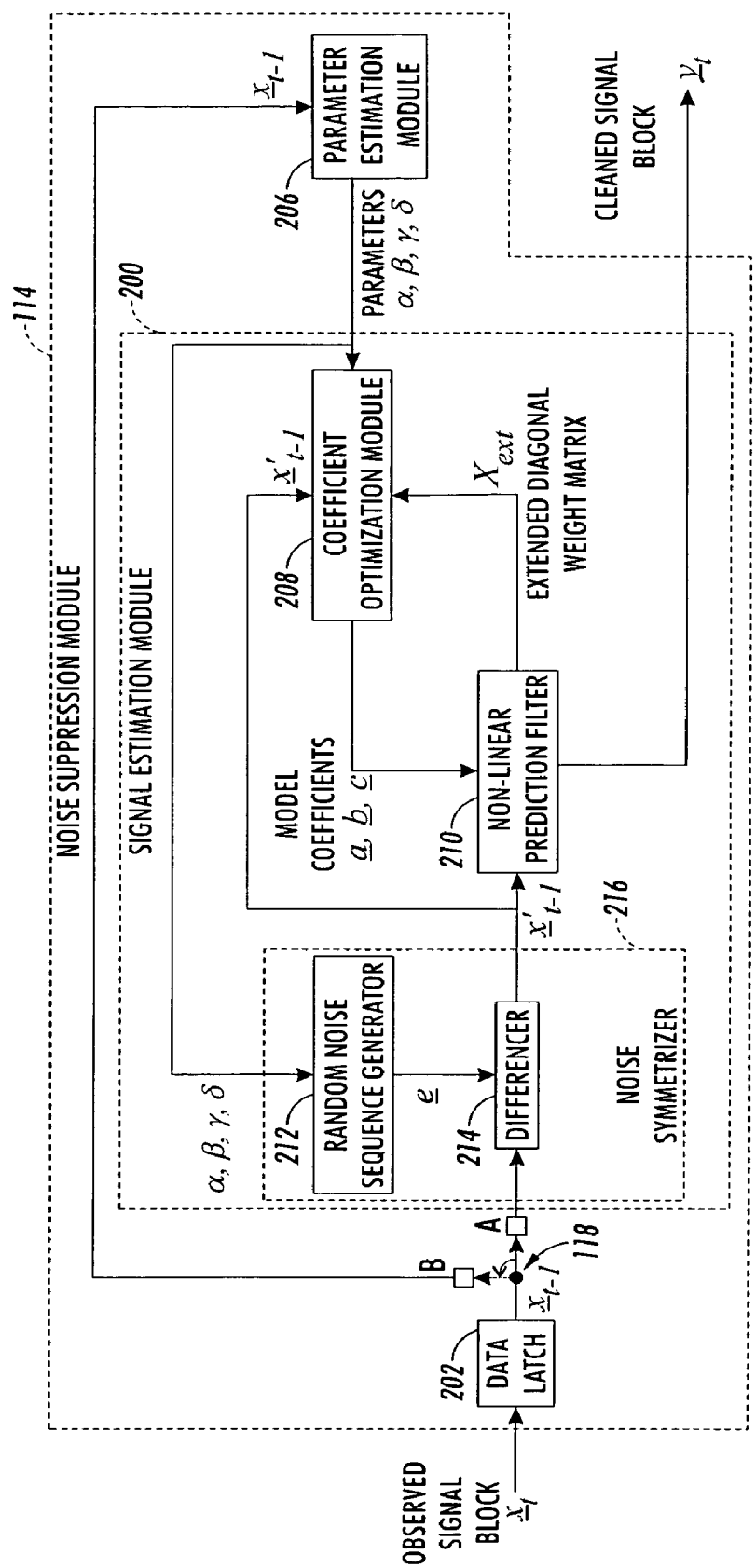
FIG. 2 illustrates a detailed block diagram of the noise suppression module shown in FIG. 1.

FIG. 2 illustrates a detailed block diagram of the noise suppression module 114 shown in FIG. 1. The noise suppression module 114 corrects distortions caused by impulse noise introduced to analog signals propagating along the data channel 110. The characteristics of additive impulse noise corrupting input signal $\underline{x}_t$ are typically unknown. Consequently, the elements of the noise suppression module 114 are used to estimate (i.e., predict) what the output signal $\underline{x}_t$ is without noise (i.e., the cleaned signal $\underline{y}_t$). Generally, the elements of the noise suppression module include a data latch 202, a signal estimation module 200 and a parameter estimation module 206. In one embodiment, the signal estimation module 200 includes a noise symmetrizer 216, a non-linear prediction filter 210, and a coefficient optimization module 208.

In operation, an observed block of L signals $\underline{x}_t$ is input to the noise suppression module 114 and stored in the data latch 202. The signals forming the observed block of signals are sampled at some predetermined interval from the analog data channel 110. The data latch 202 is a memory which stores L sampled data signals output from the analog data channel 110. The signals input to the noise symmetrizer 216 and the non-linear prediction filter 210 are delayed by one block of signals (i.e., $\underline{x}_{t-1}$), where each block of signals has a length of L samples. The observed block of signals which is stored in the memory of the data latch 202 can be represented in a matrix form as follows:

$$\underline{x}_t = \begin{bmatrix} x[t \times L] \\ \vdots \\ x[t \times L + L - 1] \end{bmatrix}, \text{ where } t = 0, 1, 2, 3, \ldots .$$

The parameter estimation module 206 estimates one or more of the parameters $\alpha$, $\beta$, $\gamma$, and $\delta$ of an alpha-stable distribution, which are defined above in equation (1). As shown in FIG. 1, signals are sampled without a data component by one of the terminating units 106 or 108 when the switch 118 is set to operating position B. When the switch 118 is set to operating position B, the terminating units 106 and 108 are in parameter estimation mode. In operating position B, null modems 116 are used to insure that no data signals are output to the analog data channel 110 so that an accurate measurement of the noise on the analog data channel can be performed. In contrast, when the switch 118 is set to operating position A, the terminating units 106 and 108 are in signal estimation mode where signals received by the noise suppression module 114 are used to estimate a clean signal (i.e., $\underline{y}_t$).

In one embodiment, a measure of the noise on the analog data channel 110 is taken and the parameters $\alpha$, $\beta$, $\gamma$, and $\delta$ are estimated once and hard-coded or fixed as input to the coefficient optimization module 208. In an alternate embodiment, the parameters $\alpha$, $\beta$, $\gamma$, and $\delta$ are adaptively estimated and modified during the operation of the noise suppression module using a new observed block of signals $\underline{x}_t$. In this alternate embodiment, the switches 118 transition from operating position A to operating position B to record samples of noise on the analog data channel 110 thereby momentarily interrupting transfer of data traffic transmitted over the analog data channel 110.

Once estimated, the parameters $\alpha$, $\beta$, $\gamma$, and $\delta$ of the alpha-stable distribution are input to the coefficient optimization module 208. In one embodiment, the coefficient optimization module 208 optimizes model coefficients $\underline{a}$, $\underline{b}$, and $\underline{c}$ of the non-linear prediction filter 210 using a modified iteratively reweighted least squares (IRLS) technique. The model coefficients $\underline{a}$, $\underline{b}$, and $\underline{c}$ are then input to the non-linear prediction filter 210 to estimate what the observed signal block $\underline{x}_{t-l}$ is without impulse noise. The cleaned signal block $\underline{y}_t$, which is an estimate of the signal block $\underline{x}_{t-l}$ without impulse noise, is defined in matrix form as:

$$\underline{y}_t = \begin{bmatrix} y[t \times L] \\ \vdots \\ y[t \times L + L - 1] \end{bmatrix}, \text{ where } t = 0, 1, 2, 3, \ldots$$

In one embodiment, the non-linear prediction filter 210 is a one-dimensional (i.e., 1-D) Volterra filter. Those skilled in the art will appreciate that the non-linear Volterra prediction filter 210 has a non-linear dependence on its input data and a linear dependence on in its coefficients $\underline{a}$, $\underline{b}$, and $\underline{c}$. Volterra filters are known in the art as disclosed by M. Schetzen, *The Volterra and Wiener Theories of Nonlinear Systems*, New York: John Wiley & Sons, 1980. It will also be appreciated by those skilled in the art that the non-linear prediction filter operates in an extrapolatory mode (i.e., extrapolation). The extrapolatory mode involves the prediction of future values using observations from past time steps (i.e., predicting values at time t=T, using observations having time steps at time t<T).

In alternate embodiments of the non-linear prediction filter 210, other non-linear filters that are linear in their coefficients such as Radial Basis Function filters (which are known in the art as disclosed by B. Mulgrew, in "Applying Radial Basis Functions," IEEE Signal Processing Magazine, Vol. 13, No.2, pp.50–65 March 1996) and Self-Exciting Threshold Autogregressive (SETAR) filters (which are known in the art as disclosed by H. L. Koul and A. Schick, in "Efficient Estimation In Nonlinear Autoregressive Time-Series Models," Bernoulli, 1997, Vol.3, No.3, pp.247–277) are used in place of a Volterra filter.

In another alternate embodiment of the non-linear prediction filter 210, the non-linear prediction filter operates in an interpolatory mode (i.e., interpolation) rather than an extrapolatory mode. In the interpolatory mode, observations from both past and future time steps [t−k,t−k+1, . . . , t−1,t+1,t+2 . . . ] are used to predict the value of the data at time step t. It will be understood by those skilled in the art that this alternate embodiment results in the same formulas as presented here in Section C up to a relabeling of the time step indices. For example given eight observed signals $\underline{x}_{t=0}$, $\underline{x}_{t=1}$, $\underline{x}_{t=2}$, $\underline{x}_{t=3}$, $\underline{x}_{t=5}$, $\underline{x}_{t=6}$, and $\underline{x}_{t=7}$, the data component $\underline{y}_{t=4}$ of a signal $\underline{x}_{t=4}$ is estimated (i.e., predicted) using the eight observed signals.

In addition to the parameters $\alpha$, $\beta$, $\gamma$, and $\delta$ of the alpha-stable distribution, the observed signal block $\underline{x}_{t-l}$, and the extended matrix $X_{ext}$ are input to the coefficient optimization module 208. As described in more detail below, the coefficient optimization module 208 uses the parameters of the alpha-stable distribution to specify an $I_p$-norm estimation criterion (i.e., cost function). The cost function is minimized by the coefficient optimization module 208 to determine the model coefficients $\underline{a}$, $\underline{b}$, and $\underline{c}$ of the non-linear prediction filter 210. However, because the $I_p$-norm estimator only produces unbiased estimates when the noise in the observed signal block $\underline{x}_{t-l}$ is symmetric, the noise symmetrizer 216 may be required to deskew and centralize the noise in an observed signal block $\underline{x}_t$. In an alternative embodiment, a zero$^{th}$ order (i.e., constant) (e.g., $a_0$ in equation (2) below) term is included in the Volterra filter to compensate for bias in the $I_p$-norm estimation.

C. Non-Linear Prediction Filter

The non-linear prediction filter 210 uses model coefficients $\underline{a}$, $\underline{b}$, and $\underline{c}$ to estimate the cleaned signals $\underline{y}_t$. The model coefficients $\underline{a}$, $\underline{b}$, and $\underline{c}$ are optimized using a parameter of an alpha-stable distribution that models impulse noise corrupting the observed signal $\underline{x}_{t-l}$. A general alpha-stable distribution is different from the Gaussian distribution because the alpha-stable distribution lacks finite second order statistics. As a result, the prediction filter 210 cannot use conventional least squares estimation techniques that are based on minimum mean squared error criterion to accurately estimate the cleaned signals $\underline{y}_t$, since such techniques employ second order statistics.

It is known that minimizing the dispersion of a parameterized random variable distributed with an alpha-stable probability density function is equivalent to minimizing the $p^{th}$ order moment of the random variable's probability distribution (see for example V. M. Zolotarev, "Mellin-Stieltjes Transforms In Probability Theory," *Theory of Probability and Applications*, vol. 2, no. 4, pp. 433– 460, 1957). Whereas the minimum mean squared error criterion leads to least squares estimation ($I_2$-norm), the minimum mean $p^{th}$-power error criterion leads to $I_p$-norm estimation.

Although the minimum mean squared error criterion leads to a linear predictor for Gaussian data with Gaussian noise, the error criterion for alpha-stable data or alpha-stable noise need not be linear. The filter 210 is, therefore, selected to be a non-linear Volterra filter or polynomial filter even if the process generating the clean data may be modeled as linear. The non-linear Volterra filter is used to estimate the data component of the observed signal $\underline{x}_{t-l}$ or of the centro-symmetrized observed signal $\underline{x}'_{t-l}$. Those skilled in the art will appreciate that the observed signal need not be centro-symmetrized before being input to the non-linear prediction filter if the noise in the observed signal is symmetric or if zero$^{th}$ order terms are included in the Volterra filter. The estimate of the data component of the observed signal $\underline{x}_{t-l}$, is defined herein as the estimated cleaned signal $\underline{y}_t$.

Using the estimated cleaned signal $\underline{y}_t$, the noise signal (or component) of the observed signal $\underline{x}_t$, can be estimated using an additive model which assumes that the noise signal is produced independently of the data signal (or component). The estimate of the noise signal is defined herein as the estimated noise signal $\underline{r}_t$. The relationship between the observed signal $\underline{x}_{t-l}$, the estimated cleaned signal $\underline{y}_t$, and the estimated noise signal $\underline{r}_t$, can therefore be represented using the additive model as:

$$\underline{x}_{t-l} = \underline{y}_t + \underline{r}_t.$$

The input-output relationship of a Volterra filter can be defined as:

$$y(n) = a_0 + \sum_{i=1}^{N} a_i x(n-i) + \sum_{i=1}^{N} \sum_{j=i}^{N} b_{i,j} x(n-i) x(n-j) + \sum_{i=1}^{N} \sum_{j=i}^{N} \sum_{k=j}^{N} c_{i,j,k} x(n-i) x(n-j) x(n-k) + \ldots \quad (2)$$

where:
  x(n) is the observed signal,
  y(n) is the data component or cleaned signal,
  n is the observed block index that runs from 0 . . . L−1, and
  $a_0$, $a_i$, $b_{i,j}$, and $c_{i,j,k}$ are the Volterra filter coefficients.

In one embodiment, the Volterra filter 210 is defined for computational efficiency with only the first three terms (excluding the term $a_0$) of the general Volterra filter set forth in equation (2). Limiting the general Volterra filter to its the first three terms defines a truncated Volterra filter having up to third order non-linearity. It will be appreciated, however, by those skilled in the art that in alternate embodiments the filter 210 can be defined using truncated Volterra filters that have less than or more than three terms.

Using this input-output relationship, the data signal $\underline{y}_t$ for a signal block is computed given the observed signal block $\underline{x}_{t-1}$ and the model (or Volterra) coefficients a, b, and c. The model coefficients a, b, and c are received from the coefficient optimization module 208. In computing the data signal $\underline{y}_t$, the observed signal block $\underline{x}_{t-1}$ is delayed by one sample. In operation, the Volterra filter uses a block of signals sampled at the times [L×t−L−1+k, L×t−L+k, ..., L×t−2+k] to estimate what a cleaned block of signals is at the times [L×t−L+k, L×t+k, ..., L×t−1+k] for some k in the range 0 to N−1. The block length L is chosen to be substantially longer than the number of coefficients in the Volterra filter.

The input-output relationship of the Volterra filter can also be represented in matrix form as:

$\underline{y} = X_{est} C$ where, the extended Volterra data matrix $X_{est} = [X^{(1)} X^{(2)} X^{(3)}]$, such that:

$$C = \begin{bmatrix} \underline{a} \\ \underline{b} \\ \underline{c} \end{bmatrix},$$

such that:

$$\underline{a} = \begin{bmatrix} a_1 \\ \vdots \\ a_N \end{bmatrix}, \underline{b} = \begin{bmatrix} b_1 \\ \vdots \\ b_{\frac{N(N+1)}{2}} \end{bmatrix}, \text{ and } \underline{c} = \begin{bmatrix} c_1 \\ \vdots \\ c_{\frac{N(N+1)(N+2)}{2}} \end{bmatrix}.$$

Figure 3:
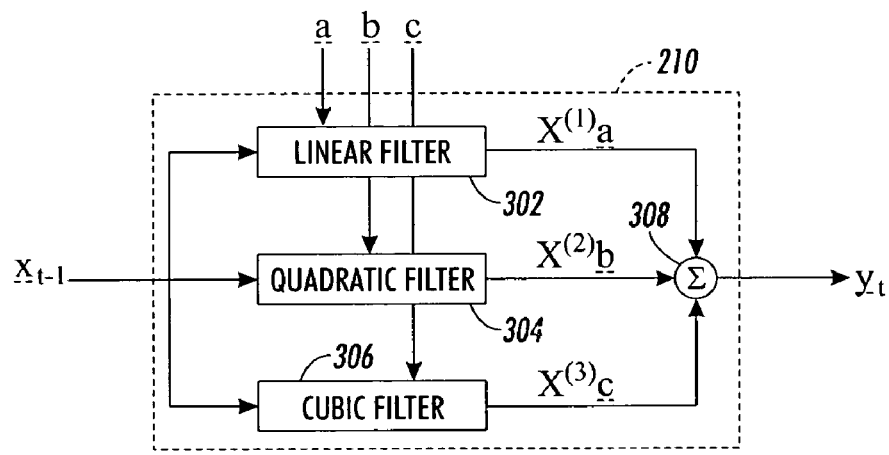
FIG. 3 illustrates a general block diagram that represents the different elements forming a Volterra filter.
Figure 4:
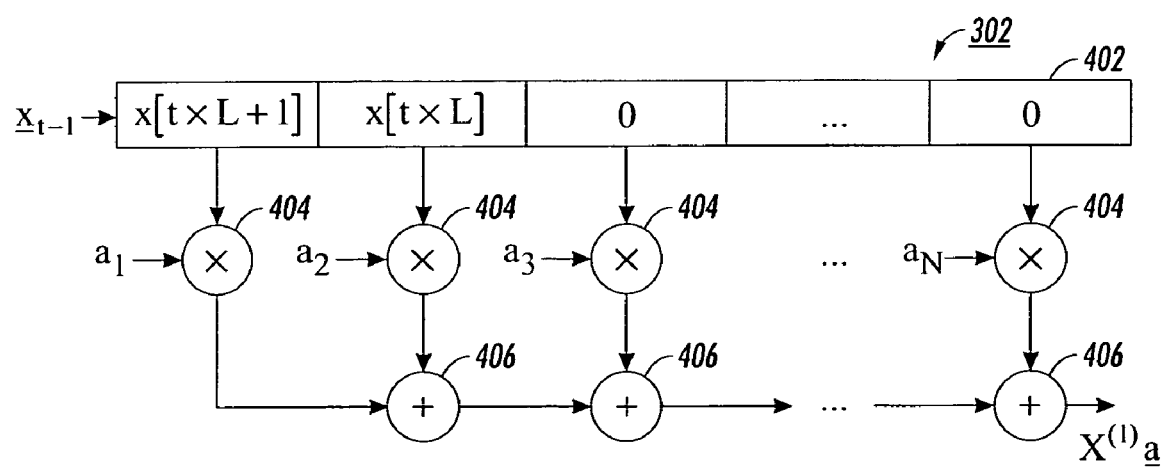
FIG. 4 illustrates an example of a linear filter that forms part of the Volterra filter shown in FIG. 3.

FIGS. 3–6 illustrate different elements of a non-linear Volterra filter 210. FIG. 3 illustrates a general block diagram that represents the different elements forming a Volterra filter. As illustrated, the delayed observed signal block $\underline{x}_{t-1}$, is input to a linear filter 302, a quadratic filter 304, and a cubic filter 306. The output of the filters 302, 304, and 306 is the product of the Volterra data matrices and Volterra coefficients defined above as $X^{(1)}\underline{a}$, $X^{(2)}\underline{b}$, and $X^{(3)}\underline{c}$. The elements in each of the resulting vectors are summed together by summation unit 308 to provide the estimated cleaned data signal $\underline{y}_t$.

$$X^{(1)} = \begin{bmatrix} x[t \times L] & 0 & \cdots & 0 \\ x[t \times L + 1] & x[t \times L] & \cdots & 0 \\ \vdots & \vdots & & \vdots \\ x[t \times L + L - 1] & x[t \times L + L - 2] & \cdots & x[t \times L + L - N] \end{bmatrix}$$

$$X^{(2)} = \begin{bmatrix} x^2[t \times L] & 0 & \cdots & 0 \\ x^2[t \times L + 1] & x[t \times L + 1]x[t \times L] & \cdots & 0 \\ \vdots & \vdots & & \vdots \\ x^2[t \times L + N] & x[t \times L + N]x[t \times L + N - 1] & \cdots & x^2[t \times L] \\ \vdots & \vdots & & \vdots \\ x^2[t \times L + L - 1] & x[t \times L + L - 1]x[t \times L + L - 2] & \cdots & x^2[t \times L + L - N] \end{bmatrix}$$

$$X^{(3)} = \begin{bmatrix} x^3[t \times L] & 0 & \cdots & 0 \\ x^3[t \times L + 1] & x^2[t \times L + 1]x[t \times L] & \cdots & 0 \\ \vdots & \vdots & & \vdots \\ x^3[t \times L + N] & x^2[t \times L + N]x[t \times L + N - 1] & \cdots & x^3[t \times L] \\ \vdots & \vdots & & \vdots \\ x^3[t \times L + L - 1] & x^2[t \times L + L - 1]x[t \times L + L - 2] & \cdots & x^3[t \times L + L - N] \end{bmatrix}$$

where:

- each row in $X^{(2)}$ (and $X^{(3)}$) corresponds to the quadratic (cubic) terms in the Volterra expansion for a fixed time instant t given in equation (2) above,
- t is a fixed time constant having a range from 0, 1, ..., N, where N represents the memory capacity of the filter 210,
- L is the data block length size; and
- the Volterra vector of coefficients FIG. 4 illustrates one embodiment of a linear filter 302. In operation, the linear filter 302 has shifted through the first register of shift register 402 each element in the sequence (or vector) of observed data signals $\underline{x}_{t-1}$, starting with the first element of the block $\underline{x}_{t-1}$(n=0). After each shift of the shift register 402, the coefficients are multiplied by the Volterra $\underline{a}$ coefficients using multipliers 404. These results are summed at adders 406 and output to define the entries in the resulting vector $X^{(1)}\underline{a}$. FIG. 3 illustrates the computation of the first element in the vector $X^{(1)}\underline{a}$. This operation can be summarized as the convolution of the input signal block $\underline{x}_{t-1}$, and the impulse response of the filter 210 (i.e., the filter coefficients a, b, and c). In an alternate embodiment, the operation in FIG. 3 is performed using overlapping blocks.

Figure 5:
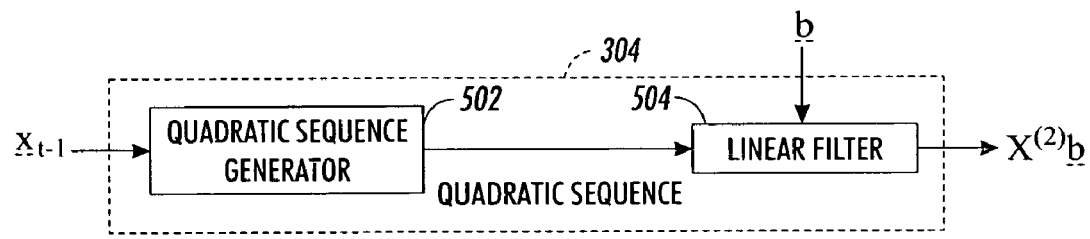
FIG. 5 illustrates an example of a quadratic filter that forms part of the Volterra filter shown in FIG. 3.
Figure 6:
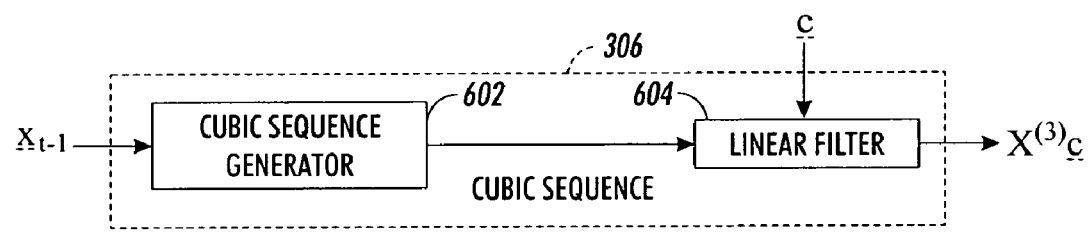
FIG. 6 illustrates an example of a cubic filter that forms part of the Volterra filter shown in FIG. 3.

FIG. 5 illustrates an example of the quadratic filter 304 illustrated in FIG. 3. The quadratic filter 304 can be defined using a quadratic sequence generator 502 and a linear filter 504. The output of the quadratic sequence generator is a quadratic sequence which is input to the linear filter 504 to produce the resulting vector $X^{(2)}\underline{b}$ which can be viewed as the convolution of the quadratic sequence with the filter coefficients $\underline{b}$. Similarly, FIG. 6 illustrates an example of a cubic filter 306 illustrated in FIG. 3. The cubic filter 306 includes a cubic sequence generator 602 for generating a cubic sequence. The resulting cubic sequence is subsequently input to the linear filter 604 to produce the resulting vector $X^{(3)}\underline{c}$. Each sample in the quadratic (cubic) sequence corresponds to (or generated such that they correspond to) a quadratic (cubic) term in the Volterra filter expression given above in equation (2). One reason for representing the Volterra filter in matrix form is to simplify the computations of the coefficient optimization module 208 by utilizing the extended matrix $X_{ext}$.

D. Coefficient Optimization Module

Figure 7:
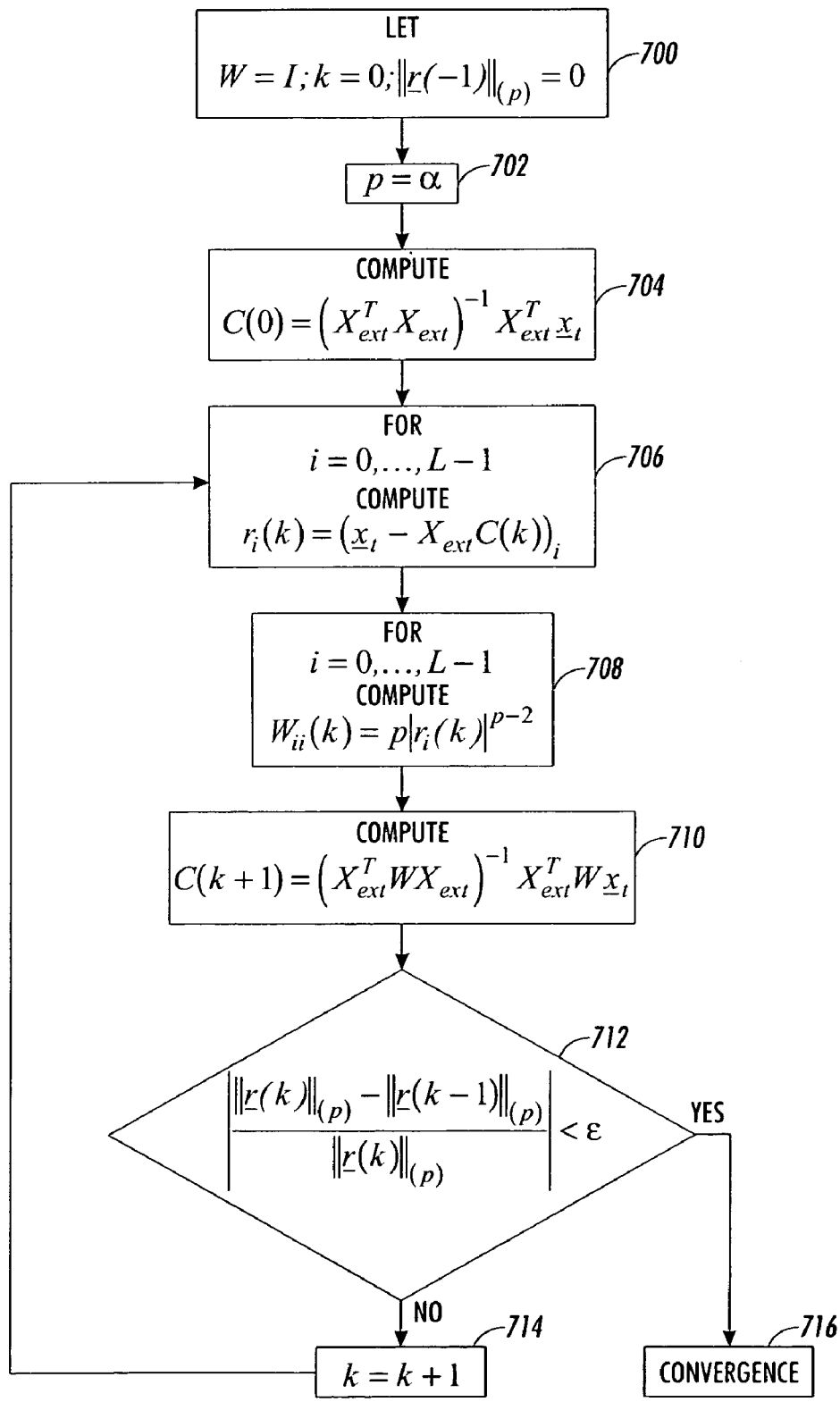
FIG. 7 is a flow diagram that sets forth the steps for adaptively determining the coefficients of the Volterra filter using a modified iteratively reweighted least squares (IRLS) technique.

As illustrated in FIG. 2, the coefficient optimization module 208 receives as input parameters from the parameter estimation module 206 and the extended matrix $X_{ext}$ from the non-linear prediction filter 210. The coefficient optimization module 208 adaptively determines the coefficients of the Volterra filter using a modified iteratively reweighted least squares (IRLS) technique. The steps for performing this technique are summarized in the flow diagram set forth in FIG. 7.

Initially at step 700, the index k is initialized to zero. Also at step 700, the weight matrix W is initialized to an identity matrix I, and the value of $\|\underline{r}(-1)\|_{(p)}$ is initialized to zero. At step 702, the value of p is set equal to the value of the characteristic exponent α received from the parameter estimation module 206. In accordance with this aspect of the invention, the value of the characteristic exponent α is used to define the order of the moment used to compute the model coefficients of the non-linear prediction filter 210.

At step 704, an initial value for the vector of Volterra coefficients C(0) is computed for k=0. Subsequently, at step 706, an error signal $r_i$ (or residual error term) is computed for each i in (0 ... L−1) using the observed signal block $\underline{x}_{t-1}$ the extended Volterra data matrix $X_{ext}$, and the vector of Volterra coefficients C(k). At step 708, elements $W_{ii}$ of the diagonal weight matrix W are computed for each i in (0 ... L−1). The resulting vector of error signals $\underline{r}_t$ and diagonal weight matrix W are defined as:

$$r_t = \begin{bmatrix} r_0 \\ \vdots \\ r_{L-1} \end{bmatrix} \text{ and } W = \begin{bmatrix} W_{0,0} & 0 & \cdots & 0 \\ 0 & W_{1,1} & & \vdots \\ \vdots & & \ddots & 0 \\ 0 & & 0 & W_{L-1,L-1} \end{bmatrix}.$$

At step 710, a vector of Volterra coefficients C(k+1) is computed for the subsequent index value (e.g., k+1) using the computed diagonal weight matrix, the extended Volterra data matrix $X_{ext}$, and the observed signal block $\underline{x}_t$. At step 712, a determination is made as to whether the error criterion for estimating the Volterra coefficients has sufficiently converged. Sufficient convergence is achieved when the relative change in the norm of the estimation error $\|\underline{r}\|_{(p)}$, between iterations is smaller than the convergence limit ε. In one embodiment, the convergence limit ε equals $10^{-4}$. The error criterion $\|\underline{r}\|_{(p)}$, which is the $p^{th}$-power error criterion, is computed as follows:

$$\|\underline{r}\|_{(p)} = \sum_{i=0}^{L-1} |r_i|^p.$$

When convergence is successfully achieved, then step 716 is performed and the vector of Volterra coefficients C(k+1) last computed at step 710 is passed to the non-linear prediction filter 210. If the solution did not successfully converge then step 714 is performed. At step 714, the index k is incremented and step 706 is repeated. It will be appreciated by those skilled in the art that an upper limit of the index k can be defined in order to assure that a Volterra coefficient vector is found at step 716 within a constrained amount of time.

E. Noise Symmetrizer

In general, the coefficient optimization module 208 can only produce unbiased estimates of the coefficients of the Volterra model with no zero$^{th}$ order term if the impulse noise has a symmetric probability density function. In accordance with another aspect of the invention, the noise symmetrizer 216, which includes a random noise sequence generator 212 and a differencer 214, is adapted to convert observed signal blocks with impulse noise having non-symmetric probability density functions into a form that can be used to compute an unbiased estimate of the coefficients of the non-linear prediction filter 210. This aspect of the invention relies on the assumption that there exists a means for obtaining replicas of observed signal blocks with the same data component but different noise component that are derived from the same statistical distribution.

More specifically, the random noise sequence generator 212 computes a matched noise sequence (i.e., a sequence with the same parameters as an observed signal block $\underline{x}_t$) using the parameters estimated by the parameter estimation module 206. In effect, the noise sequence generator 212 generates synthetic noise $\underline{e}$ using parameters of the original sample of noise input to the parameter estimation module 206. The synthetic noise sequence is a sequence of alpha-stable random variables of the same length as the original sequence $\underline{x}_t^{noise}$ input to the parameter estimation module 206 (i.e., a matched noise sequence made up of random numbers having an alpha-stable distribution). In one embodiment, the matched noise sequence is generated using an alpha-stable random number generator, which is known in the art as disclosed by J. M. Chambers, C. L. Mallows, and B. W. Stuck, in "A Method For Simulating Stable Random Variables," *Journal of the American Statistical Association*, Vol. 71, No. 354, pp. 340–344, June 1976, and hereby incorporated herein by reference.

After generating a sequence of alpha-stable variables using the random noise generator 212, the differencer 214 subtracts this sequence of synthetic noise $\underline{e}$ from the observed signal block $\underline{x}_{t-1}$, thereby converting skewed noise into symmetric noise. The resulting signal block $\underline{x}'_{t-1}$ output from the differencer 214 is a modified signal block composed of a data component and centro-symmetrized (i.e., deskewed and centralized) noise component. In effect, subtracting $\underline{e}$ from $\underline{x}_{t-1}$ results in the addition of random noise to the observed signal block $\underline{x}_{t-1}$, thereby making noise the resulting signal block $\underline{x}'_{t-1}$ symmetric. The modified signal block $\underline{x}'_{t-1}$, is then used by the non-linear prediction filter to estimate a cleaned signal block $\underline{y}_r$. Advantageously, the random noise sequence generator 212 and the differencer 214 provide an apparatus for centro-symmetrizing impulse noise in an observed signal $\underline{x}_{r-1}$ so that the $I_p$-norm minimization technique for estimating the parameters of the Volterra filter is unbiased (at least when a zero$^{th}$ order term is included and when no self-terms are included in this Volterra filter i.e., terms of the form $b_{i,j}$, $c_{i,j,k}$ where any pair of i,j,k are equal).

F. Parameter Estimation Module

Figure 8:
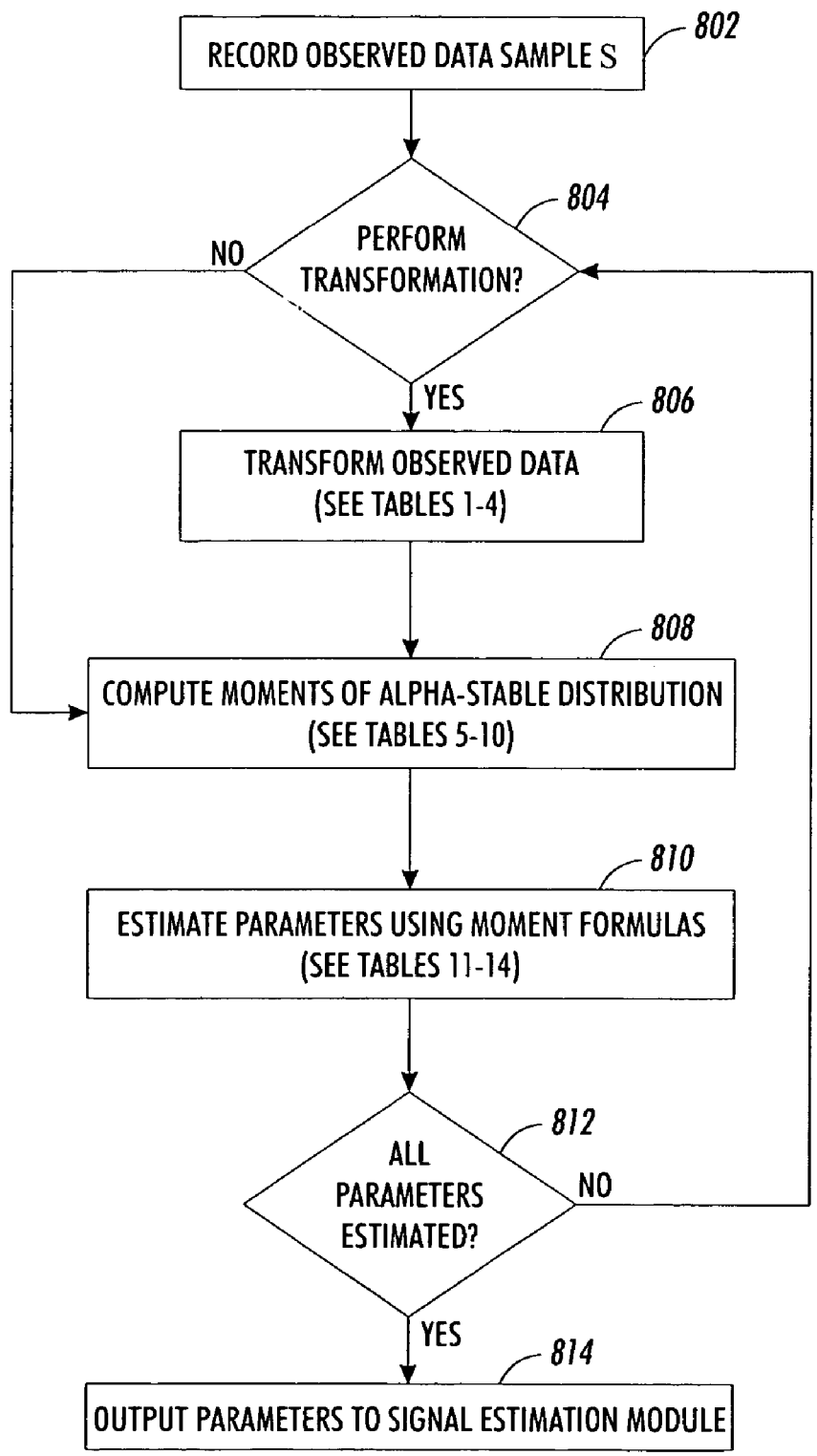
FIG. 8 illustrates a flow diagram that sets forth the steps that are performed by the parameter estimation module to estimate the parameters of an alpha-stable distribution.

FIG. 8 illustrates a flow diagram that sets forth the steps that are performed by the parameter estimation module 206 to estimate the parameters of an alpha-stable distribution. By way of overview, the steps performed by the parameter estimation module can be summarized as follows. Initially, at step 802 a block (or sequence) of observed data signals or samples $S=\{X_k\}=\{X_0, \ldots X_{L-1}\}$ is received at the parameter estimation module 206. The samples are obtained by observing a signal block when the switches 118 are set to operating position B.

At step 804, a determination is made whether to transform the observed data received at step 802. Depending on the outcome of the determination made at step 804, one or more transformations are performed on the observed data to obtain deskewed (i.e., symmetric) or centralized alpha-stable random variables at step 806. Once the transformation of the observed data is complete, moments of the alpha-stable distribution are computed at step 808. Using the computed moments, estimates of the parameters $\alpha$, $\beta$, $\gamma$, and $\delta$ of an alpha stable distribution are computed at step 810.

Step 804 is repeated depending upon whether all parameters were estimated at step 812. Once all parameters of the alpha-stable distribution have been computed, the parameters are output to the signal estimation module at step 814. It will be appreciated by those skilled in the art that the method set forth in FIG. 8 need not be used to compute every parameter, but instead can be used to estimate a subset of the four parameters $\alpha$, $\beta$, $\gamma$, and $\delta$ of an alpha-stable distribution.

F.1 Transformations

More specifically at step 804, a decision is made whether to perform one or more transformations on the sequences of data signals $X_k$. Those transformations selected to be performed at step 804 are computed at step 806. The purpose of performing a transformation is to eliminate one or more of the parameters in the distribution, thereby minimizing the number of variables that are being solved for at any one time. The transformations presented below in Tables 1–4 are used to generate, for example, sequences with $\delta=0$ or $\beta=0$, or with sequences with both $\delta=0$ and $\beta=0$ (except when $\alpha=1$). Advantageously, by using such sequences, methods that can be applied to symmetric variates can be applied to skewed variates. In addition, skew-estimation methods for centered variates can be applied to non-centered variates, with a loss of some sample size.

The transformations that can be performed at step 804 include a centro-symmetrization transformation $X_k^{CS}$, a symmetrization transformation $X_k^S$, and a centralization transformation $X_k^C$. Another available transformation at step 804 is a relocated or approximately centralized transformation $X_k^R$, which requires an estimate of the location parameter $\delta$. Each of these transformations are set forth in Tables 1–4, respectively. More specifically, each of the Tables 1–4 set forth a particular transformation that takes the weighted sums of the sequences of noise signals $X_k$ (i.e., sequence of stable variates).

The resulting transformed sequence of noise signals are defined in Tables 1–4 in the form of the parameters of the alpha stable distribution $S_\alpha$ (dispersion parameter $\gamma$, symmetry parameter $\beta$, location parameter $\delta$) for some value of the characteristic exponent $\alpha$ (e.g., $\beta=1.5$). Which one or ones of these four transformations are performed at step 806 depends on the particular variable of the alpha-stable distribution being solved at step 810.

TABLE 1

Centro-Symmetrization Transformation

| Transformation | Resulting Parameters |
|---|---|
| $X_k^{CS} = X_{2k} - X_{2k-1}$ | $S_\alpha(2\gamma, 0, 0)$ |

TABLE 2

Symmetrization Transformation

| Transformation | Resulting Parameters |
|---|---|
| $X_k^S = X_{3k} + X_{3k-1} - 2^{1/\alpha}X_{3k-2}$ | $S_\alpha(4\gamma, 0, [2 - 2^{1/\alpha}]\delta)$ |

TABLE 3

Centralization Transformation

| Transformation | Resulting Parameters |
|---|---|
| $X_k^C = X_{3k} + X_{3k-1} - 2X_{3k-2}$ | $S_\alpha\left([2 + 2^\alpha]\gamma, \frac{2 - 2^\alpha}{2 + 2^\alpha}\beta, 0\right)$ |

TABLE 4

Relocation Transformation

| Transformation | Resulting Parameters |
|---|---|
| $X_k^R = X_k - \delta$ | $S_\alpha(\gamma, \beta, 0)$ |

F.2 Computing Moments of Alpha-Stable Distributions

After transforming the observed noise signals at step 806 if necessary, moments for the alpha-stable distribution are estimated at step 809. Estimating a moment of an alpha-stable distribution involves evaluating the equations set forth in Tables 5–10 with n samples (where L=n samples in FIG. 2) of the transformed signals. It will be appreciated by those skilled in the art that other choices of sample length may be employed to provide a better trade-off between computation or sampling time and variance of the parameter estimates. Specifically, set forth in Tables 5–10 are formulas for computing up to six different classes of moments. The different classes of moments include absolute fractional lower order moments (FLOM), signed FLOM, signed logarithmic moments, absolute logarithmic moments, extreme value moments, and empirical characteristic function moments each of which is set forth in Tables 5–10 respectively. In these tables, random variables are denoted by capital letters (e.g., example x).

In Tables 5 and 6, the $p^{th}$ order moment should be chosen on the basis of a lower bound on the possible value of the parameter alpha. If this lower bound is $\alpha_{min}$, then a value of $p=\alpha_{min}/4$ is a good choice of p. The value of p should not be chosen to be too large, since if p is greater than $\alpha/2$ then the variance of the FLOM is infinite, and the variance of the alpha estimate is therefore large. If p is too small then the absolute FLOM will be close to one, and the variance of the alpha estimate again becomes large.

TABLE 5

Absolute FLOM

| Moment | Moment Estimate |
|---|---|
| $A_p = E\|X\|^p$ | $\hat{A}_p = \dfrac{1}{n}\sum_{k=1}^{n}\|X_k\|^p$, where p is the order of the moment |

TABLE 6

Signed FLOM

| Moment | Moment Estimate |
|---|---|
| $S_p = EX^{<p>}$ | $\hat{S}_p = \dfrac{1}{n}\sum_{k=1}^{n}\text{sign}(X_k)\|X_k\|^p$, where p is the order of the moment |

TABLE 7

Signed Logarithmic

| Moment | Moment Estimate |
|---|---|
| $\Lambda = E\,\text{sign}(X)\log\|X\|$ | $\hat{\Lambda} = \dfrac{1}{n}\sum_{k=1}^{n}\text{sign}(X_k)\log\|X_k\|$ |

TABLE 8

Absolute Logarithmic

| Moment | Moment Estimate |
|---|---|
| $L_1 = E\,\log\|X\|$ | $\hat{L}_1 = \dfrac{1}{n}\sum_{k=1}^{n}\log\|X_k\|$ |
| $L_2 = E\,(\log\|X\| - L_1)^2$ | $\hat{L}_2 = \dfrac{1}{n-1}\left(\sum_{k=1}^{n}\log\|X_k\| - \hat{L}_1\right)^2$ |
| $L_3 = E\,(\log\|X\| - L_2)^3$ | $\hat{L}_3 = \dfrac{1}{n-1}\left(\sum_{k=1}^{n}\log\|X_k\| - \hat{L}_1\right)^3$ |

TABLE 9

Extreme Value

| Moment | Moment Estimate |
|---|---|
| $\overline{Y}_1 = E\,\max\log X$ <br> $\underline{Y}_1 = E\,\max\log(-X)$ <br> $\overline{Y}_2 = E((\max\log) - \overline{Y}_1)^2$ <br><br> $\underline{Y}_2 = E((\max\log(-X)) - \underline{Y}_1)^2$ | Initially, find the maximum (denoted by over bar) and minimum (denoted by underscore) logarithm in each length r block of the data sample, thus: <br><br> $\overline{K}_k = \max\{\log X_{r(k-1)+1},\ \log X_{r(k-1)+2},\ \ldots\ \log X_{r(k-1)+r-1}\}$ <br> $\underline{K}_k = \max\{\log -X_{r(k-1)+1},\ \log -X_{r(k-1)+2},\ \ldots\ \log -X_{r(k-1)+r-1}\}$ <br><br> Subsequently, compute the mean and variance of these K to obtain the estimates of the Y's, thus: <br><br> $\hat{\overline{Y}}_1 = \dfrac{1}{n/r}\sum_{k=1}^{n/r}\overline{K}_k$ <br> $\hat{\underline{Y}}_1 = \dfrac{1}{n/r}\sum_{k=1}^{n/r}\underline{K}_k$ <br> $\hat{\overline{Y}}_2 = \dfrac{1}{(n/r)-1}\sum_{k=1}^{n/r}\left(\overline{K}_k - \hat{\overline{Y}}_1\right)^2$ <br> $\hat{\underline{Y}}_2 = \dfrac{1}{(n/r)-1}\sum_{k=1}^{n/r}\left(\underline{K}_k - \hat{\underline{Y}}_1\right)^2$ |

TABLE 10

Empirical Characteristic Function

| Moment | Moment Estimate |
|---|---|
| $\varphi(p) = E e^{jpX}$ | $\hat{\varphi}(p) = \dfrac{1}{n}\sum_{k=1}^{n} e^{jpX_k}$, where p is the order of the moment |

F.3 Estimating Parameters Using the Computed Moments

Using the moments computed using Tables 5–10, the parameters of an alpha-stable distribution $\alpha$, $\beta$, $\gamma$, and $\delta$ are computed using the formulas given in Tables 11–14. Each of the Tables 11–14 have an "ID" column, a "condition" column, and an "estimator" column. The "ID" column identifies different estimators for the same parameter. The "condition" column defines when a particular moment computed at step 808 may be applied. For some of the estimates of the parameters, there is included a lower bound on the alpha estimate (i.e., $\alpha_{min}$). For these cases, the $\alpha_{min}$ prevents numerical problems from arising and improves the performance of the estimators in situations where such a bound is available. It has been found that a good estimate of $\alpha_{min}$ for signal transmission systems is one (i.e., $\alpha_{min}=1$). It will be appreciated that dependent on which of the transformations from Tables 1–3 are applied prior to application of these estimators, it will be necessary to re-transform the estimates obtained for the transformed sample back to the parameter values for the original sample.

Some of the estimators in the Tables 11–14 include a superscript X or Y on the moment as in estimators $\hat{\alpha}_2$ and $\hat{\alpha}_3$ set forth in Tables 11B and 11C. The presence of a superscript X or Y means that the noise samples (e.g., signal block $\underline{x}_t$) are partitioned into two parts $\underline{U}$ and $\underline{V}$, with each part containing data samples $U_1$, $U_2$, $U_3$, . . . and $V_1$, $V_2$, $V_3$, . . . respectively. The moment with superscript X is computed for the summed samples as:

$$X_1 = U_1 + V_1,\ X_2 = U_2 + V_2,\ X_3 = U_3 + V_3,\ \ldots,$$

while that for superscript Y is computed for the concatenated samples as:

$$Y_1 = U_1,\ Y_2 = V_1,\ Y_3 = U_2,\ Y_4 = V_2,\ Y_5 = U_3,\ Y_6 = V_3, \ldots$$

In addition, some of the estimators of alpha in the Tables 11A–11E include an auxiliary variable Z. The auxiliary variable Z is used to denote some intermediate function of certain moments to simplify the exposition. Also in the estimator $\hat{\alpha}$ set forth in Table 11A, the arcsinc function is used. By definition, the arcsinc function is the inverse of the sinc function (i.e., if $y = \text{sinc}(x) = \sin(x)/x$ and if $0 \le x < \pi$, then $x = \text{arcsinc}(y)$). In the estimator $\hat{\delta}_1$ in Table 13, a sample's f-fractile is computed. A sample's f-fractile is the point x for which a fraction f of the sample lies below x. For example, the lower quartile of the data is the 0.25-fractile and the median is the 0.5-fractile.

In the estimator $\hat{\delta}_2$ in Table 13, the p % truncated sample mean is computed. The p % truncated sample mean is the mean of all samples except those larger than the (p/2)% largest and smaller than the (p/2)% smallest samples. For example, given a sorted list of one-hundred samples, the p % truncated sample mean is computed by truncating p/2 of the largest and p/2 of the smallest samples in the sorted list of samples.

TABLE 11A

Estimate of Alpha

| ID | Condition | Estimator |
|---|---|---|
| $\hat{\alpha}_1$ | $\delta = 0$, $\beta = 0$, $p < \dfrac{\alpha_{min}}{2}$ | $\hat{Z} = \dfrac{\tan\left(\dfrac{\pi p}{2}\right)}{\left(\dfrac{\pi p}{2} \hat{A}_p \hat{A}_{-p}\right)}$ <br> If $\hat{Z} > \text{sinc}(\pi p / \alpha_{min})$, then $\hat{\alpha} = \alpha_{min}$, <br> else if $\hat{Z} < \text{sinc}(\pi p / 2)$, then $\hat{\alpha} = 2$ <br> otherwise $\hat{\alpha} = \pi p (\text{arcsinc}(\hat{Z}))^{-1}$. |

TABLE 11B

Estimate of Alpha

| ID | Condition | Estimator |
|---|---|---|
| $\hat{\alpha}_2$ | $\delta = 0$, $p < \dfrac{\alpha_{min}}{2}$ | $\hat{Z} = \log \hat{A}_p^X - \log \hat{A}_p^Y$ <br> If $\hat{Z} < \dfrac{p \log 2}{\alpha_{min}}$, then $\hat{\alpha} = \alpha_{min}$, <br> else if $\hat{Z} > \dfrac{p \log 2}{2}$, then $\hat{\alpha} = 2$ <br> otherwise $\hat{\alpha} = \dfrac{p \log 2}{\hat{Z}}$. |

TABLE 11C

Estimate of Alpha

| ID | Condition | Estimator |
|---|---|---|
| $\hat{\alpha}_3$ | $\delta = 0$ | $\hat{Z} = \hat{L}_1^X - \hat{L}_1^Y$ <br> If $\hat{Z} < \dfrac{p \log 2}{\alpha_{min}}$, then $\hat{\alpha} = \alpha_{min}$, <br> else if $\hat{Z} > \dfrac{\log 2}{2}$, then $\hat{\alpha} = 2$ <br> otherwise $\hat{\alpha} = \dfrac{\log 2}{\hat{Z}}$. |

TABLE 11D

Estimate of Alpha

| ID | Condition | Estimator |
|---|---|---|
| $\hat{\alpha}_4$ | $\delta = 0$ | $\hat{Z} = \left(1 - \dfrac{\hat{L}_3}{\psi}\right)^{1/3}$, where <br> $\psi = 1.2020569\ldots = \left[\dfrac{d^3}{dx^3} \Gamma(x)\right]_{x=1}$. <br> If $\hat{Z} < \alpha_{min}$, then $\hat{\alpha} = \alpha_{min}$, <br> else if $\hat{Z} > 2$, then $\hat{\alpha} = 2$ <br> otherwise $\hat{\alpha} = \hat{Z}$. |

TABLE 11E

Estimate of Alpha

| ID | Condition | Estimator |
|---|---|---|
| $\hat{\alpha}_5$ | $\delta = 0$ | $\hat{Z} = \frac{\pi}{2\sqrt{6}}\left(\frac{1}{\overline{Y}_2} + \frac{1}{\underline{Y}_2}\right)^{1/2}$ <br> If $\hat{Z} < \alpha_{\min}$, then $\hat{\alpha} = \alpha_{\min}$, <br> else if $\hat{Z} > 2$, then $\hat{\alpha} = 2$ <br> otherwise $\hat{\alpha} = \hat{Z}$. |

TABLE 12

Estimates of Beta

| ID | Condition | Estimate |
|---|---|---|
| $\hat{\beta}_1$ | $\delta = 0$, estimate of $\alpha$ available | $\hat{\beta} = \frac{\tan(\hat{S}_0 \alpha\pi/2)}{\tan(\alpha\pi/2)}.$ |
| $\hat{\beta}_2$ | $\delta = 0$, estimate of $\alpha$ available | $\hat{\beta} = \frac{\tan\left(\left(\hat{\Lambda}/\hat{L}_1\right)\alpha\pi/2\right)}{\tan(\alpha\pi/2)}.$ |
| $\hat{\beta}_3$ | $\delta = 0$, estimate of $\alpha$ available | $\hat{\beta} = 1 - \frac{2}{\exp(\alpha(\overline{Y}_1 - \underline{Y}_1))}.$ |

TABLE 13

Estimates of Gamma

| ID | Condition | Estimate |
|---|---|---|
| $\hat{\gamma}_1$ | $\delta = 0$, estimate of $\alpha, \beta$ available, $p < \alpha/2$ | $\hat{\gamma} = \left(\frac{\Gamma(1-p)\cos(p\pi/2)}{\Gamma(1-p/\alpha)\cos(p\theta/\alpha)}\right)^{\alpha/p} |\cos\theta|,$ <br> where $\theta = \arctan(\beta\tan(\alpha\pi/2))$. |
| $\hat{\gamma}_2$ | $\delta = 0$, estimate of $\alpha, \beta$ available | $\hat{\gamma} = \exp(\alpha\hat{L}_1 + \psi(1-\alpha))|\cos\theta|,$ <br> where $\theta = \arctan(\beta\tan(\alpha\pi))$ and <br> where $\psi$ is as defined in Table 11D. |

TABLE 14

Estimates of Delta

| ID | Condition | Estimate |
|---|---|---|
| $\hat{\delta}_1$ | Estimate of $\alpha, \beta$ available | $\hat{\delta}$ = the f – fractile of the sample, where $f = \frac{1}{2} - \frac{\theta}{\pi\alpha}$, $\theta = \arctan(\beta\tan(\alpha\pi/2))$. |
| $\hat{\delta}_2$ | $\beta = 0$ | $\hat{\delta}$ = the p% truncated sample mean (this also includes the median). |

F.4 Origins of the Parameter Estimators for Stable Distributions

Sections F.4.1–F.4.4 describe the principles used to derive the equations set forth in Tables 1–14.

F.4.1 FLOM Estimators

The estimators based on the fractional lower order moments (FLOM) are all rearrangements of the formula in Theorem 1.

Theorem 1: If X is a stable random variable with parameters $\alpha$, $\beta$, $\gamma$, and with $\delta=0$ then:

$$E[(\text{sign}(X))^k |X|^p] = \frac{\Gamma\left(1-\frac{p}{a}\right)}{\Gamma(1-p)}\left|\frac{\gamma}{\cos\theta}\right|^{\frac{p}{a}} \frac{\cos\left(\frac{p\theta}{\alpha} - \frac{k\pi}{2}\right)}{\cos\left(\frac{(p-k)\pi}{2}\right)},$$

with $p \in (-2,-1) \cup (-1,\alpha)$, $p \neq 1$, for $k=1$,
or with $p \in (-1,\alpha)$, $p \neq 1$ for $k=0$,
where tan $$\theta = \beta \tan\frac{\alpha\pi}{2}.$$

The proof of Theorem 1 is disclosed by V. M. Zolotarev, in "One-dimensional Stable Distributions", Providence, R.I.: AMS, 1984.

F.4.2 Logarithmic Estimators

The estimators based on logarithmic moments are the consequence of differentiating the formula of Theorem 1 and rearranging the formulae obtained by applying the following result:

Lemma 2: Assuming the necessary derivatives exist for a random variable X, $$E[(\log|X|)^k] = \lim_{p \to 0} \frac{d^k}{dp^k} E[|X|^p] \text{ for } k = 1, 2, \ldots .$$

The proof of Lemma 2 is arrived at by differentiating the moment generating function for the logarithmic process.

F.4.3 Extreme Value Estimators

Extreme value estimators are parameter estimators for the Frechet distribution which the tails of the stable pdf obey, which is given by following theorem:

Theorem 3: The tails of a stable pdf are asymptotically described by:

$$\lim_{\lambda \to \infty} Pr(X > \lambda) \sim C(\alpha)(1+\beta)\lambda^{-\alpha}$$

$$\lim_{\lambda \to \infty} Pr(X < -\lambda) \sim C(\alpha)(1-\beta)(-\lambda)^{-\alpha}$$

for a suitable function $C(\alpha)$.

The proof of Theorem 3 is disclosed by G. Samorodnitsky and M. S. Taqqu, in Stable Non-Gaussian Random Processes: Stochastic Models with Infinite Variance, Chapman & Hall, New York, 1994.

F.4.4 Weighted Empirical Characteristic Function Estimators

The empirical characteristic function estimator has been described by S. Kogon and D. B. Williams, in "On The Characterization Of Impulsive Noise With Alpha-Stable Distributions Using Fourier Techniques," Asilomar Conf. on Signals, Systems, and Computers, 1995. The weighted version of this estimator may be derived by:

1) Taylor expanding the residuals in the classical characteristic function method up to $1^{st}$ order in the moment estimates.
2) Approximating the covariance matrix of the residuals using this Taylor expansion.
3) Computing the maximum likelihood estimate of the parameters assuming the residuals have a normal distribution with covariance described by the approximated covariance matrix.

G. Estimation Examples

Figure 9A:
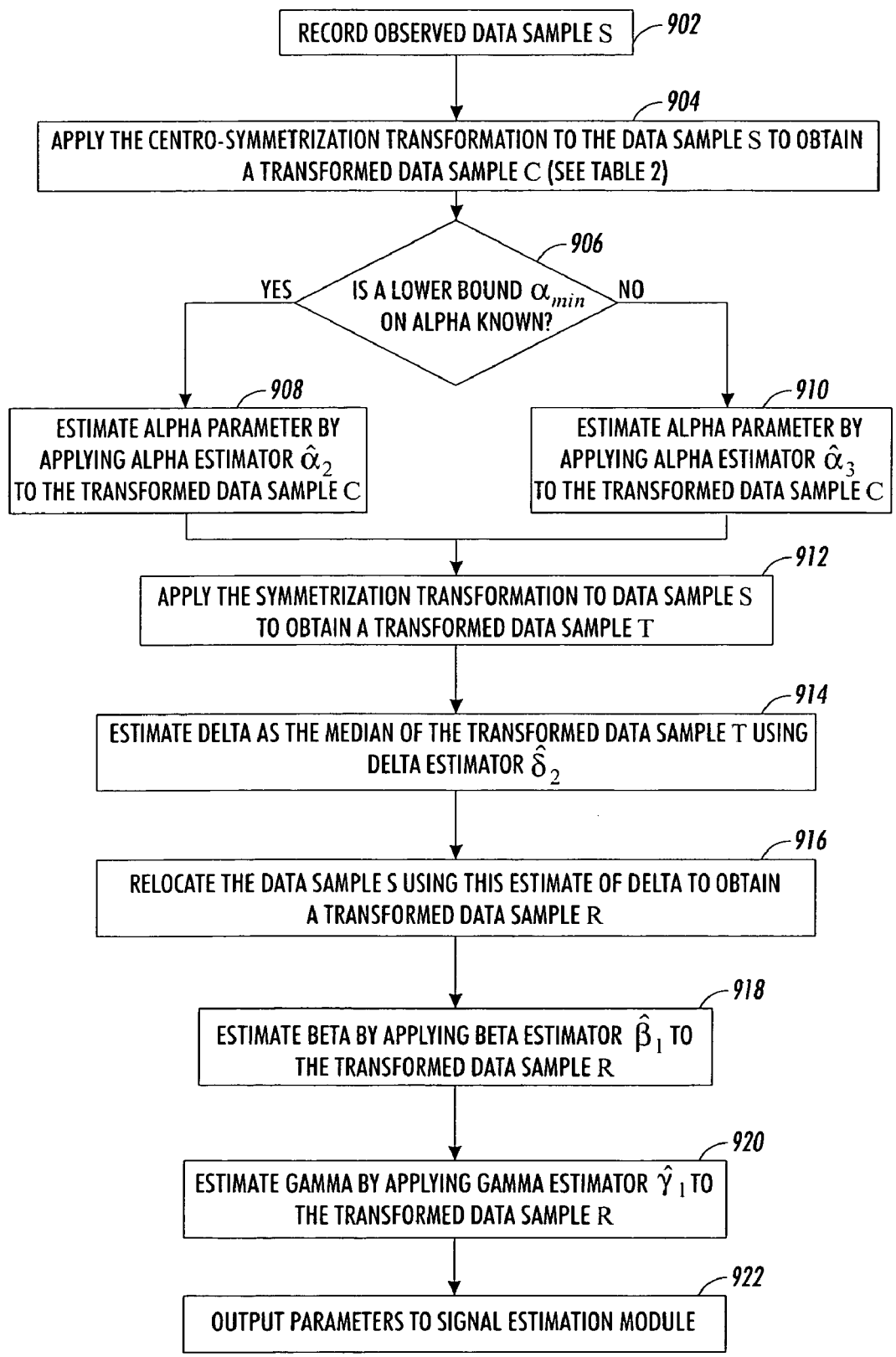

FIG. 9A is a flow diagram which sets forth one combination of steps for estimating the parameters $\alpha$, $\beta$, $\gamma$, and $\delta$ of an alpha-stable distribution. More specifically, FIG. 9A sets forth an example of a particular sequence in which the steps in FIG. 8 can be performed. It will be appreciated by those skilled in the art that the flow diagram sets forth only one of many different possible sequences in which the estimators in Tables 11–14 can be applied, as evidenced by the condition column in the Tables.

Initially at step 902, a data sample S (e.g., signal block $\underline{x}_{t-1}$) is observed with the switch 118 in operating position B. At step 904, the centro-symmetrization transform set forth in Table 3 is applied to the data sample S to obtain a transformed data sample C. A determination is made at step 906 whether a lower bound (i.e., $\alpha_{min}$) on alpha is known. In one embodiment, the lower bound on alpha is assumed to equal one—this is an appropriate choice for most communication systems. If there exists such a lower bound on alpha, then an estimate for the alpha parameter is computed at step 908 by applying the alpha estimator $\alpha_2$ to the data sample C; otherwise, the alpha parameter is computed at step 910 by applying the alpha estimator $\alpha_3$ to the data sample C. The alpha estimators $\alpha_2$ and $\alpha_3$ are defined above in Tables 11A and 11B, respectively.

To estimate the parameter 6 for the data sample S, steps 912 and 914 are performed. At step 912, the symmetrization transformation set forth in Table 2 is applied to the data sample S to obtain a transformed data sample T. At step 914, the parameter $\beta$ is estimated as the median of the transformed data sample T using the delta estimator $\hat{\delta}_2$, set forth in Table 14. This estimate is divided by $(2-2^{1/\alpha})$ to obtain a delta estimate appropriate for the untransformed sample. Subsequently at step 916, the data sample S is relocated using the estimate of delta computed at step 914 to obtain a transformed data sample R. At step 918, the parameter beta is estimated by applying the beta estimator $\hat{\beta}_1$ set forth in Table 12 to the transformed data sample R. In addition at step 920, the parameter gamma is estimated by applying the gamma estimator $\hat{\gamma}_1$ set forth in Table 13 to the transformed data sample R. At step 922, the estimated parameters for the alpha-stable distribution are output to the signal estimation module at step 922.

Figure 9B:
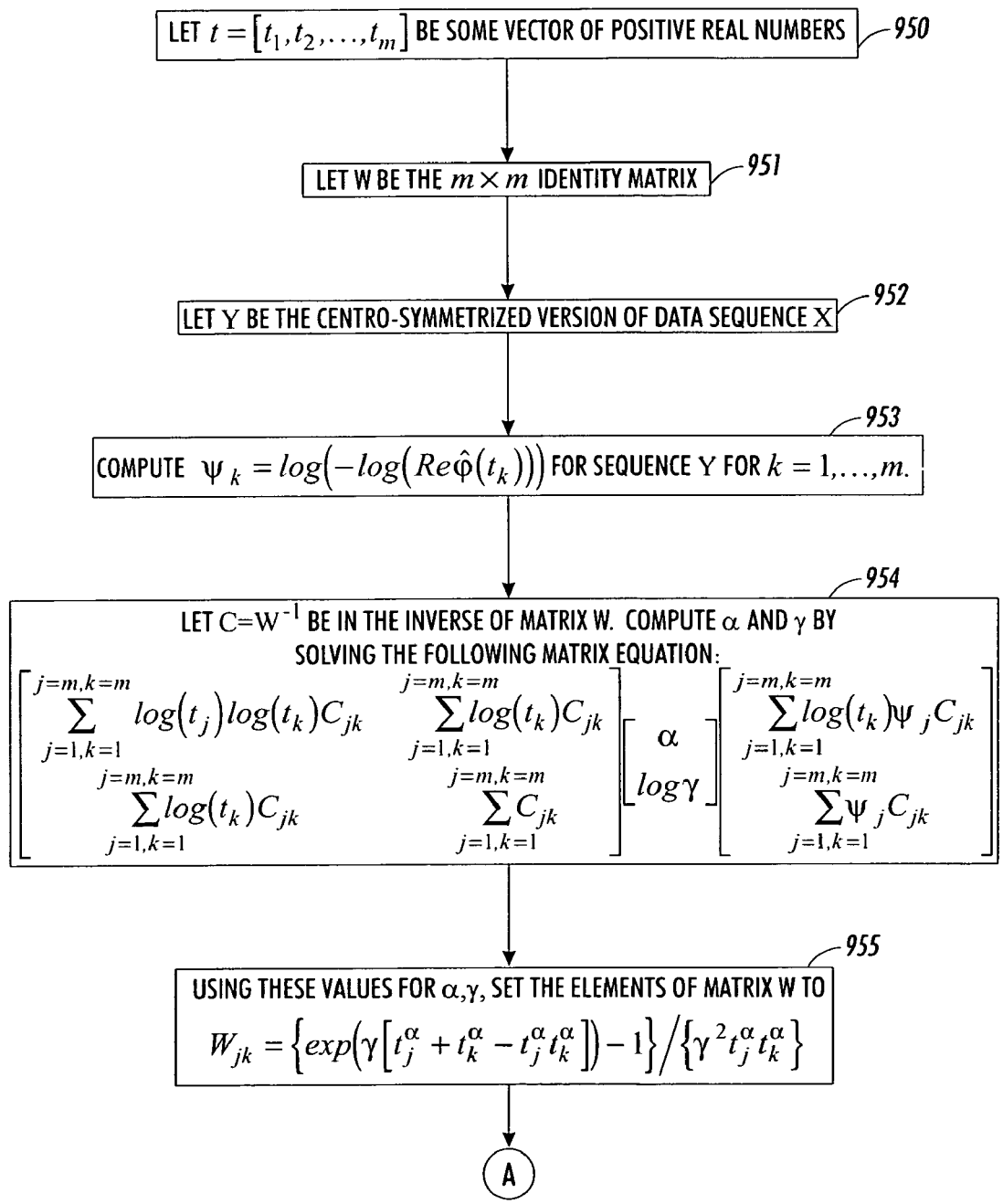

In another embodiment, FIGS. 9B and 9C set forth another combination of steps 950–961 that can be performed to estimate the parameters $\alpha$, $\beta$, $\gamma$, and $\delta$ of an alpha-stable distribution. More specifically, the estimator of the parameters is a weighted empirical characteristic function estimator (see Table 10). It is known to perform an empirical characteristic function method without performing the steps 955, 956, 960, and 961. Advantageously, the additional steps 955, 956, 960, and 961 greatly reduce the variance of the estimates of the parameters. It will be appreciated by those skilled in the art that it may be advantageous to iterate through steps 955, 956, 960, and 961 more than once to yield better estimates.

The embodiment shown in FIGS. 9B and 9C first observes a data sample S (e.g., signal block $\underline{x}_{t-1}$) with the switch 118 in operating position B. Since the characteristic function is the Fourier transform of the pdf of a distribution, it is necessary to select some frequencies (i.e. arguments of the characteristic function) to use for estimation. At step 950, the set of frequencies $[t_1, t_2, \ldots, t_m]$ is chosen to be a sequence of positive real numbers. The numbers are chosen to be positive in order to simplify the presentation of subsequent steps of the estimation procedure. However, it is important that the numbers be unique and non-zero. A good choice for these numbers has been found to be [0.05, 0.10, 0.15, . . . , 0.90, 0.95, 1.0].

At step 952, the centro-symmetrization transform set forth in Table 3 is applied to the data sample S to obtain a transformed data sample Y. At step 953, the empirical characteristic function is estimated at each of the frequencies selected at step 950, using the formula given in Table 10. The logarithm of the logarithm of the characteristic function estimate at frequency $t_k$ is computed and assigned to a variable $\psi_k$. From the formula for the characteristic function of an alpha-stable random variable (i.e., equation (1)), it can be seen that such a double logarithm has a linear dependence on the characteristic exponent $\alpha$ and on the logarithm of the dispersion log $\gamma$. Hence a linear regression is used to estimate these parameters.

Since the residuals in this regression are correlated, good estimates are not expected unless a weighting matrix is employed to decorrelate them. However, the extent of the correlation depends on the values of the characteristic exponent and dispersion parameters, which are what is being estimated. Therefore, an iterative solution procedure is employed in which the weighting matrix and the parameters are alternately estimated. The solution procedure is initialized at step 951 by assuming that the weighting matrix is the identity matrix. New parameter estimates are obtained at step 954. Using these parameters a new weighting matrix is determined at step 955. At step 956, a more accurate set of parameter estimates is produced. It is possible to iterate this procedure a number of times. However, it has been found that a single iteration (as shown in FIGS. 9B and 9C) usually provides most of the improvement in the estimates that can be obtained.

Next it is necessary to estimate the skew and location parameters of the distribution. This is accomplished at steps 957–961 by making use of the characteristic exponent and dispersion estimates obtained at step 956. At step 957, the imaginary parts of the logarithm of the empirical characteristic function are computed for the original data (rather than the centro-symmetrized data) using the formula given in Table 10. These quantities are divided by their frequency and assigned to the variables $\omega_k$. From the formula for the characteristic function of an alpha-stable random variable (i.e., equation (1)), it can be seen that these quantities have a linear dependence on the skew parameter $\beta$ and on the location parameter $\delta$. Hence step 957 performs a linear regression to estimate these parameters.

The regression is again performed iteratively, starting from an identity matrix estimate of the weight matrix at step 958 and producing an improved estimate of the weight matrix at step 960. The formula for the weight matrix has been given in terms of the real and imaginary parts of the characteristic function evaluated at the frequencies chosen in step 950 and at the sums and differences of these frequencies.

Finally, after one or more iterations, at step 961 the estimated parameters for the alpha-stable distribution are output to the signal estimation module 200.

H. Alternate Operating Environment

Figure 10:
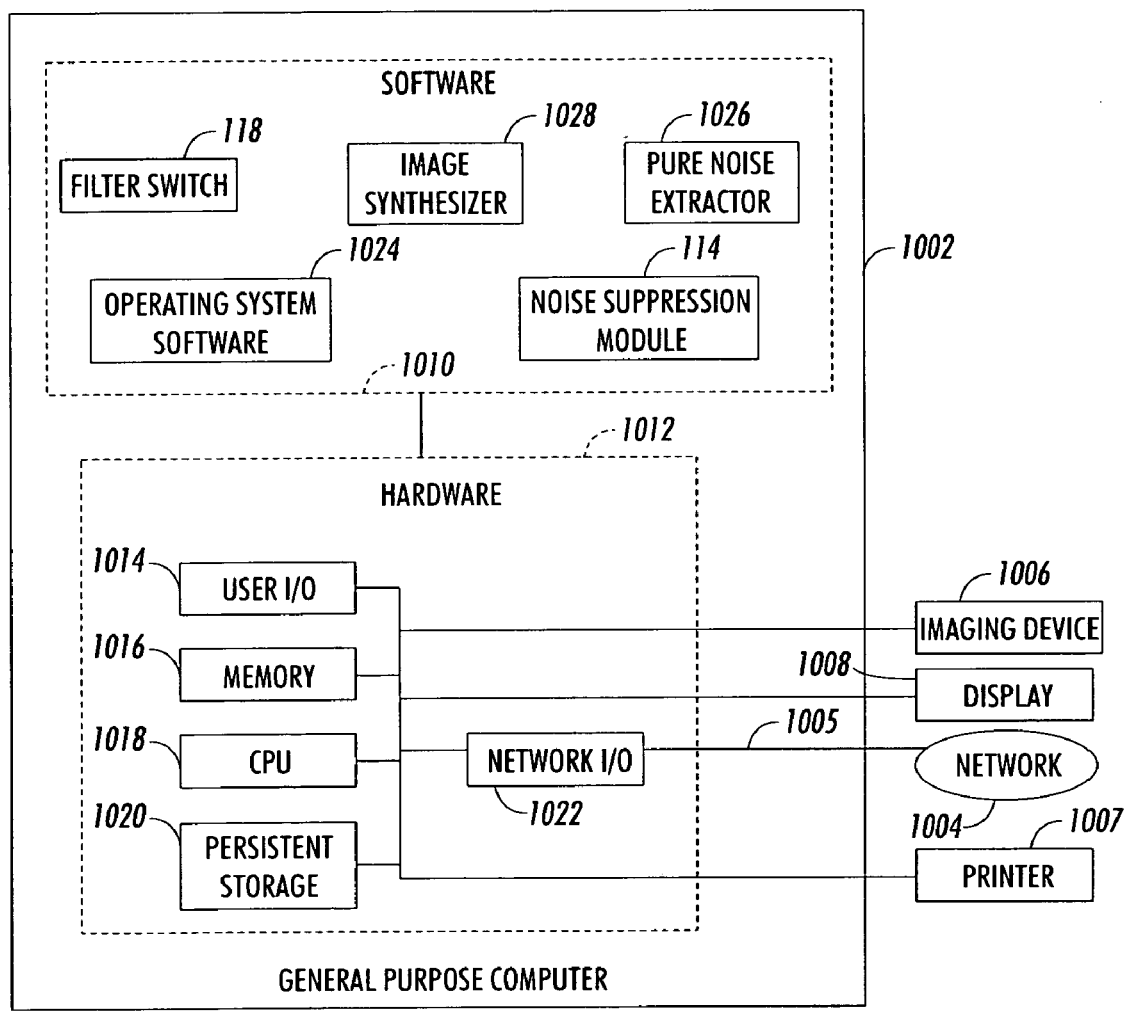
FIG. 10 illustrates an alternate operating environment of a digital image processing system for performing the present invention.

FIG. 10 illustrates an alternate operating environment for performing the present invention. The operating environment illustrated in FIG. 10 is directed at an image processing system (i.e., signal processing system), and more particularly to an image processing system for cleaning impulse noise from digitally recorded or artificially generated images. FIG. 10 shows hardware components 1012 and software components 1010 of the digital image processing system operating on a general-purpose computer 1002.

When operating, the general-purpose computer 1002 receives digital images from an imaging device 1004 or an imaging synthesizer 1028. The imaging device or imaging synthesizer may be operating local to the general purpose computer 1002 or may be operating on a network 1004 such as the Internet, thereby requiring digital images to be received through a transmission medium 1005 coupling the network 1004 and network I/O 1022 of the general purpose computer 1002.

Also coupled to the general-purpose computer 1002 is a printer 1007 and a display 1008 for outputting digital images. Additional hardware components 1012 operating in the general purpose-computer 1002 include user I/O 1014, memory 1016, CPU 1018, and storage 1020. In addition, the software components 1010 operating in the general-purpose computer include operating system software 1024, filter switch 118, pure noise extractor 1026, and noise suppression module 114.

Figure 11:
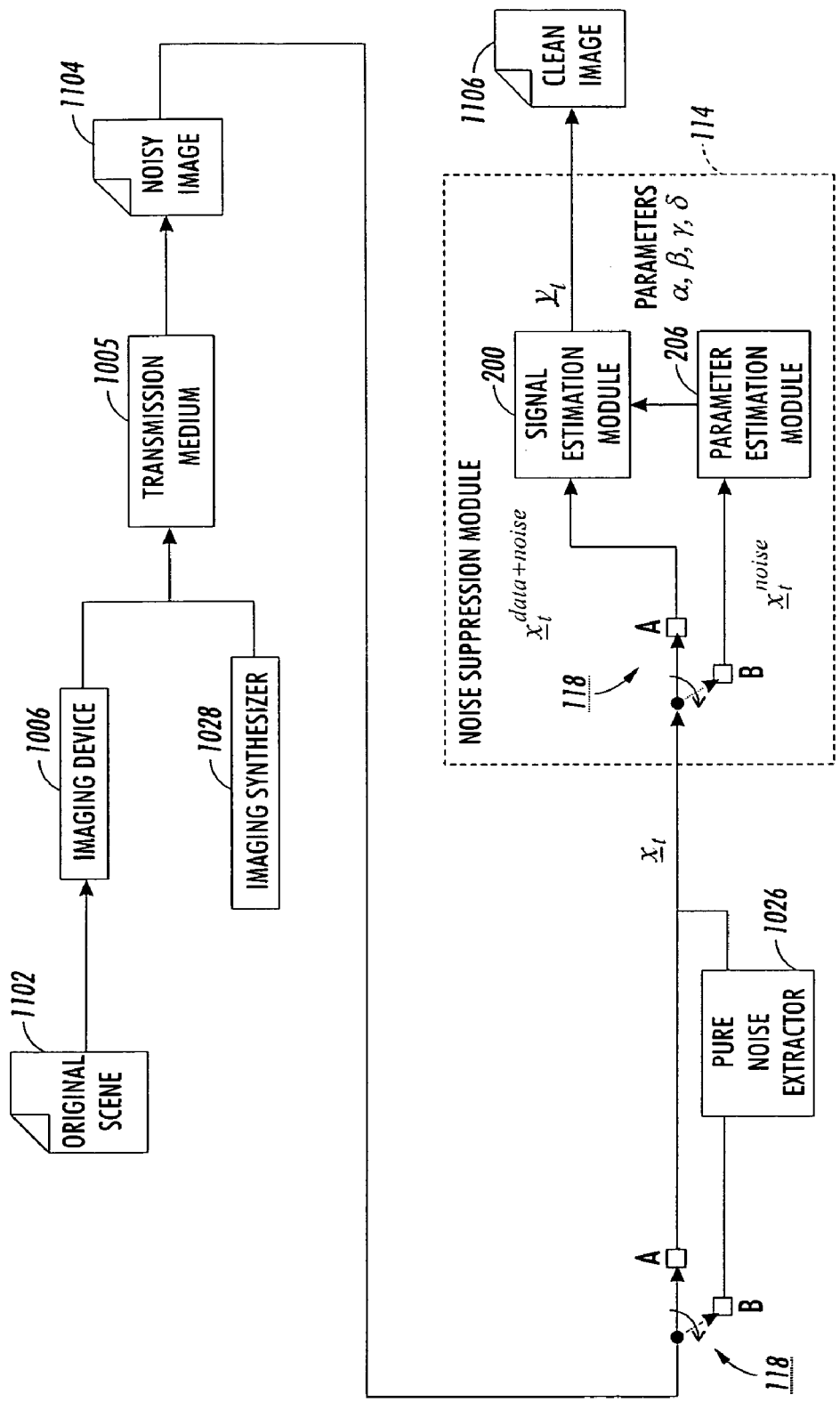
FIG. 11 illustrates a process for cleaning impulse noise from digital images in accordance with the alternate operating environment of the present invention.

FIG. 11 illustrates a process for cleaning impulse noise from digital images recorded by imaging device 1006 or formulated by imaging synthesizer 1028 in accordance with the present invention. In the event the imaging device 1006 is operating, an image of an original scene 1102 is recorded with an imaging device such as a scanner, a digital camera, a camera with a frame grabber, or the like. Typically, an image captured by an imaging device includes noise inherent in the image signal sampled using the imaging device.

One source of impulse noise corrupting noisy digital image 1104 is the transmission medium 1005. Noise that degrades the quality of sampled image signals can either be signal dependent noise or additive noise. It is assumed for the purposes of this invention that impulse noise that corrupts image data is additive, similar to impulse noise corrupting data signals transmitted over analog data channel 110 (shown in FIG. 1).

The filter switch 118, as set forth above, has two operating positions. The operating position A is the normal operating mode of the noise suppression module 114. The elements forming the noise suppression module 114 are set forth in FIG. 2 and described above. In normal operating mode, noisy images are cleaned as described above to produce an estimate of a clean image 1106. In operating position B, the filter switch 118 directs noisy digital image 1104 to the pure noise extractor 1026. The purpose of the pure noise extractor 1026 is to provide the parameter estimation module 206 with an observed signal block that consists entirely of impulse noise that is absent of image content.

The pure noise extractor 1026 is necessary because the impulse noise corrupting an image recorded with the imaging device 1006 cannot be measured independent of the data signals. That is, although the noise is additive, it cannot be independently measured as shown in FIG. 1 using null modem 116. As set forth above, estimating the parameters of an alpha stable distribution of the imaging device 1006 requires an observed signal block consisting of impulse noise to be input to parameter estimation module 206.

Figure 12:
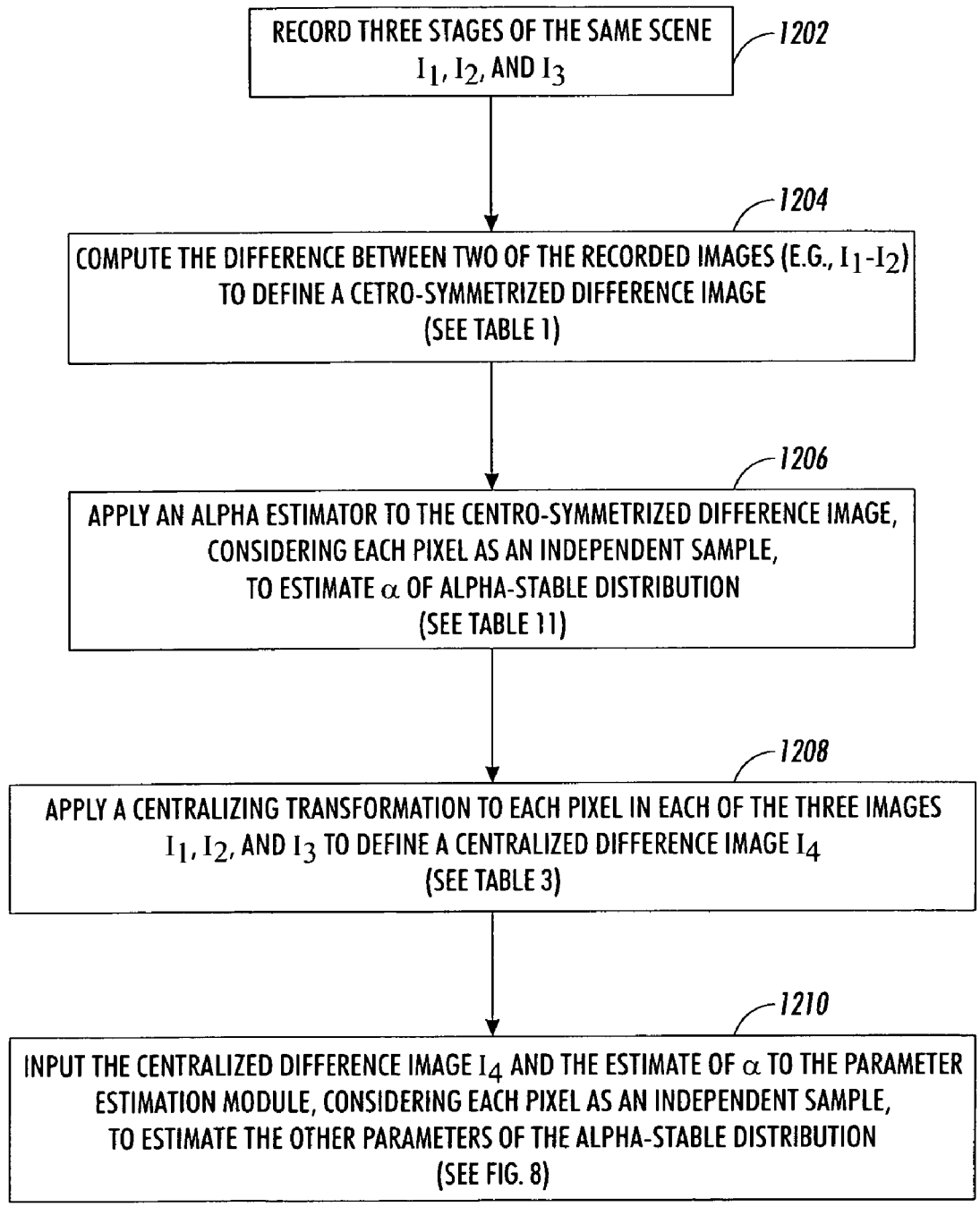
FIG. 12 is a flow diagram that sets forth the steps performed by the pure noise extractor to produce an observed signal block that consists of impulse noise absent of image content.

FIG. 12 is a flow diagram that sets forth the steps performed by the pure noise extractor 1026 to produce an observed signal block that consists of impulse noise and no image content. Initially at step 1202, three images $I_1$, $I_2$, and $I_3$ of the same original scene 1102 are recorded using imaging device 1006 and transmitted, if necessary, through transmission medium 1005 to pure noise extractor 1026. At step 1204, the difference between two of the images recorded at step 1026 is computed (e.g., $I_1-I_2$) to define a centro-symmetrized difference image. This operation has the effect of canceling the data component and performing the centro-symmetrization transformation set forth in Table 1 on the noise component.

At step 1206, an estimate of the characteristic exponent α is obtained by applying one of the alpha estimators set forth in Tables 11A–11E to the centro-symmetrized difference image. Subsequently at step 1208, a centralizing transformation, which is set forth in Table 3, is applied to the three images $I_1$, $I_2$, and $I_3$ to define a centralized difference image $I_4$. At step 1210, the centralized difference image $I_4$ computed at step 1208 is input to the parameter estimation module 206. The parameter estimation module 206 computes the parameters of an alpha-stable distribution by considering each pixel of the image as an independent sample. Once computed, these parameters are then input to the signal estimation module 200 for estimating clean image 1106.

In a first alternate embodiment of the pure noise extractor 1026, an image recorded with the imaging device 1006 or the like that consists of characters or line segments. A segment of the image that has no characters or line segments is isolated. Because the isolated area is absent image content, it can be input into the parameter estimation module 206 to estimate the alpha-stable parameters.

In a second alternate embodiment of the pure noise extractor, a search is performed to identify an area of an image recorded with the imaging device 1006 that is smooth or flat. A smooth or flat region is one which has a constant background region or that has small changes in gray level or luminance across an area of the recorded image. Properties of a such a region in an image can be discovered by moving a window over the recorded image and detecting when greater than ninety percent of the gray values lie within plus or minus epsilon of some gray-value, where epsilon is a pre-selected threshold value. All the points in the discovered region are treated as independent samples of an alpha-stable distribution and input to the parameter estimation module 206.

In an alternate embodiment of the non-linear prediction filter 210, the signal estimation module 200 shown in detail in FIG. 2 is configured to accept signal blocks that are two dimensional matrices. In the event a one-dimensional Volterra filter is used to estimate a cleaned signal block, images recorded by the imaging device 1006 or formulated by the imaging synthesizer 1028 are treated as one-dimensional vectors. To accommodate two-dimensions in this alternate embodiment, the non-linear prediction filter 210 is modified as described below.

An example of a two-dimensional (i.e., 2-D) non-linear prediction filter 210 is a 2-D Volterra system that can be described as:

$$y(m, n) = \sum_i \sum_j a(i, j) \times (m - i, n - j) + \quad (3)$$

$$\sum_i \sum_j \sum_k \sum_l b(i, j, k, l) \times (m - i, n - j) \times$$

$$(m - k, n - l) + \sum_i \ldots \sum_r c(i, j, k, l, s, r) \times$$

$$(m - i, n - j) \times (m - k, n - l) \times (n - r, n - s).$$

More details of this Volterra model are described in "A Computational Method For The Design Of 2-D Nonlinear Volterra Models," by G. F. Ramponi, G. L. Sicuranza, W. Ukovich, *IEEE Trans. On Circuits and Systems*, Vol. 35, No. 9, September 1988, pp. 1095–1102, which is hereby incorporated by reference.

The 2-D Volterra model set forth above extends up to third order non-linearity. Extending the 2-D Volterra model to a fourth order non-linearity provides little improvement in noise suppression but is much more computationally intensive. The summations in the 2-D Volterra model apply to a neighborhood of the pixel under consideration. For simplicity, only the nine pixels that make up a 3×3 square centered at the pixel being considered are included in the sum. However, alternative neighborhood structures can also be applied. In addition, it will be appreciated by those skilled in the art that techniques are available for eliminating insignificant coefficients in the summations as described by K. C. Nisbet, B. Mulgrew, and S. McLaughlin, in "Reduced State Methods In Nonlinear Prediction," Signal Processing, Vol. 48, pp. 37–49, 1996. R. D. Nowak and B. D. van Veen, "Reduced Parameter Volterra Filters," Proceedings of ICASSP-95, Vol. 3, pp. 1569–1572, 1995.

Also, in this alternate embodiment, the matrices in the coefficient optimization module 208 are constructed by placing every coefficient in the summation of equation (3) in a vector. The data terms x(.), x(.)x(.) and x(.)x(.)x(.) are placed in the vector according to the scheme of the 1-D embodiment. This produces a matrix equation for the 2-D embodiment identical in form to the 1-D embodiment. The only difference between the 1-D and 2-D embodiments is that the entries of the vector of coefficients are defined by the above-described neighboring structure. Once complete, the coefficient optimization module 208 is run as described above for the 1-D embodiment.

SUMMARY

It will be appreciated that the present invention may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

The invention claimed is:

1. A method for reducing impulse noise in a signal processing system, comprising the steps of:
   estimating parameters of an alpha-stable distribution to model impulse noise that corrupts data signals input into a transmission medium of the signal processing system;
   sampling signals from the transmission medium; said sampling step storing the sampled signals in a memory; the sampled signals having a noise component and a data component; and
   computing with a prediction filter an estimate of the data components of the sampled signals using the estimated parameters of the alpha-stable distribution;
   wherein said sampling step is performed using an imaging device.

2. The method according to claim 1, further comprising the steps of:
   recording a first, a second, and a third image with the imaging device;
   computing a difference between the first and the second image to define a centro-symmetrized difference image;
   estimating a characteristic exponent of an alpha-stable distribution using the centro-symmetrized difference image; and
   computing a sample of impulse noise signals by applying a centralizing transformation to the first, the second, and the third images.

3. The method according to claim 1, further comprising the steps of:
   generating a synthetic noise signal with a random number generator that uses the parameters of the alpha-stable distribution as input parameters to the random number generator; and
   subtracting the synthetic noise signal from the sampled signal to produce a modified sampled signal; the modified sampled signal having a noise component with a symmetric distribution.

4. The method according to claim 1, further comprising the steps of:
   estimating a characteristic exponent of the alpha-stable distribution that models impulse noise corrupting the sampled signal; and
   optimizing model coefficients of the prediction filter using the estimated characteristic exponent of the alpha-stable distribution.

5. The method according to claim 4, wherein said optimizing step minimizes a $p^{th}$-power error criterion to optimize the model coefficients of the prediction filter.

6. The method according to claim 1, wherein said computing step extrapolates with the prediction filter an estimate of the data components of the sampled signals using the estimated parameters of the alpha-stable distribution.

7. The method according to claim 1, wherein said computing step interpolates with the prediction filter an estimate of the data components of the sampled signals using the estimated parameters of the alpha-stable distribution.

8. The method according to claim 1, further comprising the step of computing a moment of the alpha-stable distribution.

9. The method according to claim 8, wherein said step of computing a moment comprises the step of computing one of:

an absolute fractional lower order moment $$\hat{A}_p = \frac{1}{n}\sum_{k=1}^{n} |X_k|^p,$$

a signed fractional lower order moment $$\hat{S}_p = \frac{1}{n}\sum_{k=1}^{n} \text{sign}(X_k)|X_k|^p,$$

a signed logarithmic moment $$\hat{\Lambda} = \frac{1}{n}\sum_{k=1}^{n} \text{sign}(X_k)\log|X_k|,$$

a first absolute logarithmic moment $$\hat{L}_1 = \frac{1}{n}\sum_{k=1}^{n} \log|X_k|,$$

a second absolute logarithmic moment $$\hat{L}_2 = \frac{1}{n-1}\left(\sum_{k=1}^{n} \log|X_k| - \hat{L}_1\right)^2,$$

a third absolute logarithmic moment $$\hat{L}_3 = \frac{1}{n-1}\left(\sum_{k=1}^{n} \log|X_k| - \hat{L}_1\right)^3,$$

an empirical characteristic function moment $$\hat{\varphi}(p) = \frac{1}{n}\sum_{k=1}^{n} e^{jpX_k},$$

a first upper extreme value moment $$\hat{\overline{Y}}_1 = \frac{1}{n/r}\sum_{k=1}^{n/r} \overline{K}_k,$$

a first lower extreme value moment $$\hat{\underline{Y}}_1 = \frac{1}{n/r}\sum_{k=1}^{n/r} \underline{K}_k,$$

a second upper extreme value moment $$\hat{\overline{Y}}_2 = \frac{1}{(n/r)-1}\sum_{k=1}^{n/r} \left(\overline{K}_k - \hat{\overline{Y}}_1\right)^2,$$

and a second lower extreme value moment $$\hat{\underline{Y}}_2 = \frac{1}{(n/r)-1}\sum_{k=1}^{n/r} \left(\underline{K}_k - \hat{\underline{Y}}_1\right)^2,$$

where:

$X_k$ is one sample from a sequence of noise samples $\{X_1, X_2, \ldots, X_n\}$, p is the order of the moment, $\overline{K}_k = \max \{\log X_{r(k-1)+1}, \log X_{r(k-1)+2}, \ldots \log X_{r(k-1)+r-1}\}$, $\underline{K}_k = \max \{\log -X_{r(k-1)+1}, \log -X_{r(k-1)+2}, \ldots \log -X_{r(k-1)+r-1}\}$, and r is a block length of data.

10. The method according to claim 1, further comprising the steps of:
computing a characteristic exponent α of the alpha-stable distribution
computing a location parameter δ of the alpha-stable distribution,
computing a symmetry parameter β of the alpha-stable distribution, and
computing a dispersion γ of the alpha-stable distribution.

11. An apparatus for reducing impulse noise in a signal processing system, comprising:
a parameter estimation module for estimating parameters of an alpha-stable distribution; the alpha-stable distribution modeling impulse noise that corrupts data signals input into a transmission medium of the signal processing system;
a memory for accumulating sampled signals output from the transmission medium; the sampled signals having a noise component and a data component; and
a signal estimation module for computing an estimate of the data component of the sampled signals output from the transmission medium using the estimated parameters of the alpha-stable distribution;
wherein the signal processing system operates in an imaging device.

12. The apparatus according to claim 11, wherein said signal estimation module further comprises:
a prediction filter for estimating, using model coefficients, the data components of the sampled signals output from the transmission medium; the estimated data components corresponding to an estimation of the data signals input into the transmission medium; and
a coefficient optimization module for optimizing the model coefficients of the prediction filter using one of the estimated parameters of the alpha-stable distribution received from said parameter estimation module.

13. The apparatus according to claim 12, wherein the dependence of the prediction filter output on the model coefficients is linear.

14. The apparatus according to claim 12, wherein the dependence of the prediction filter output on the data components of the sampled signals input into said prediction filter is non-linear.

15. The apparatus according to claim 12, wherein said parameter estimation module further comprises:
   means for computing moments of the alpha-stable distribution; and
   means for estimating the parameters of the alpha-stable distribution with the computed moments.

16. The apparatus according to claim 15, wherein said parameters estimation module further comprises means for transforming the alpha-stable distribution to obtain deskewed alpha-stable random variables.

17. The apparatus according to claim 15, wherein said parameters estimation module further comprises means for transforming the alpha-stable distribution to obtain centralized alpha-stable random variables.

18. The apparatus according to claim 12, wherein said parameter estimation module adaptively estimates the parameters of the alpha-stable distribution.

19. The apparatus according to claim 12, wherein said coefficient optimization module uses the parameters of the alpha-stable distribution to specify a minimum dispersion error criterion for determining the model coefficients of said prediction filter.

20. The apparatus according to claim 19, wherein said coefficient optimization module minimizes a cost function defined by the minimum dispersion error criterion to optimize the model coefficients of said prediction filter.

* * * * *